US007325954B2

(12) United States Patent
Futami

(10) Patent No.: US 7,325,954 B2
(45) Date of Patent: Feb. 5, 2008

(54) VEHICLE LIGHT

(75) Inventor: Takashi Futami, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 11/535,342

(22) Filed: Sep. 26, 2006

(65) Prior Publication Data

US 2007/0070642 A1 Mar. 29, 2007

(30) Foreign Application Priority Data

| | | |
|---|---|---|
| Sep. 26, 2005 | (JP) | 2005-277161 |
| Feb. 6, 2006 | (JP) | 2006-027808 |
| Apr. 17, 2006 | (JP) | 2006-112915 |

(51) Int. Cl.
*B60Q 1/00* (2006.01)

(52) U.S. Cl. ...................... 362/538; 362/514; 362/516; 362/517; 362/525; 362/548; 362/214; 362/346; 362/347

(58) Field of Classification Search ................ 362/538, 362/514, 516, 517, 548
See application file for complete search history.

(56) References Cited

U.S. PATENT DOCUMENTS 6,152,589 A * 11/2000 Kawaguchi et al. ........ 362/518
6,244,732 B1 * 6/2001 Futami et al. .............. 362/328
6,575,608 B2 * 6/2003 Oyama et al. .............. 362/517
6,994,460 B2 2/2006 Yamamura
7,093,966 B2 8/2006 Yamamura

FOREIGN PATENT DOCUMENTS

| | | |
|---|---|---|
| JP | 2004127830 | 4/2004 |
| JP | 2005100766 | 4/2005 |
| JP | 2005166282 | 6/2005 |

* cited by examiner

*Primary Examiner*—Ali Alavi
*Assistant Examiner*—Evan Dzierzynski
(74) *Attorney, Agent, or Firm*—Cermak Kenealy & Vaidya LLP

(57) ABSTRACT

A vehicle light with a bulb arranged sideway is provided which can reduce a length of the entire light without a deterioration in its brightness and with a simple configuration. The vehicle light can include a light source arranged sideway on an optical axis extending horizontally in the front-to-rear direction of a vehicle. First and second projection lenses can be arranged in front of the light source above and below the optical axis. First and second reflecting surfaces can be provided for reflecting light emitted from the light source to the respective first and second projection lenses. A third reflecting surface can be provided for reflecting light emitted upward from the light source toward the area below the light source. A plane mirror can also be provided and configured to direct light reflected from the third reflecting surface toward the rear focus of the second projection lens.

22 Claims, 18 Drawing Sheets

Conventional Art
Fig. 1A
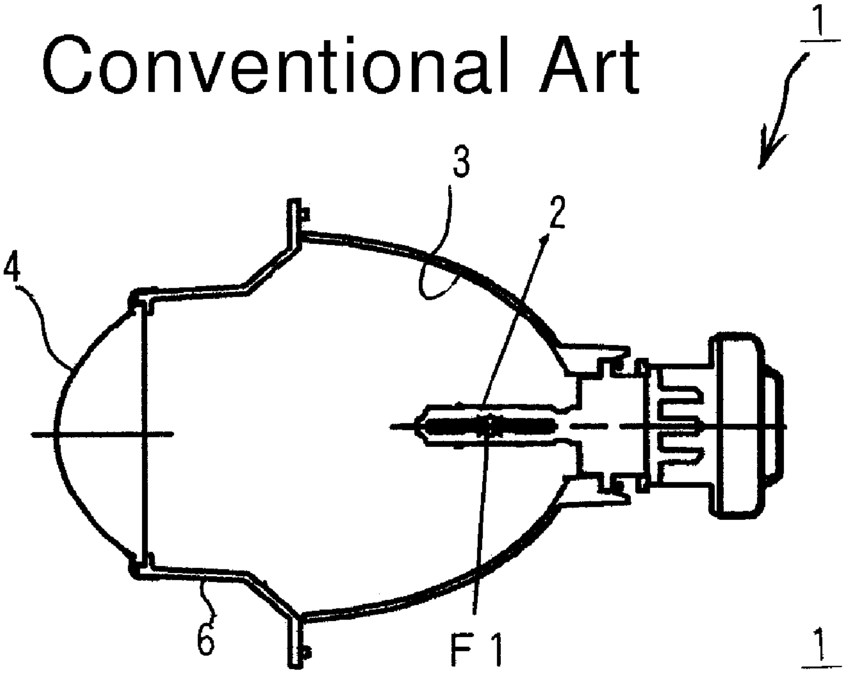
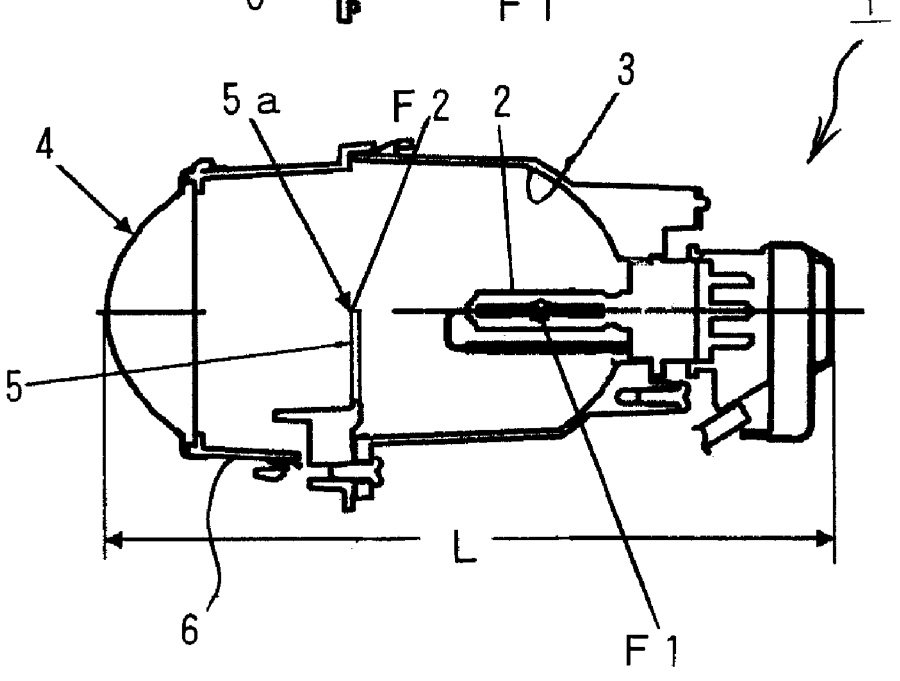
Fig. 1B Conventional Art

Fig. 6A
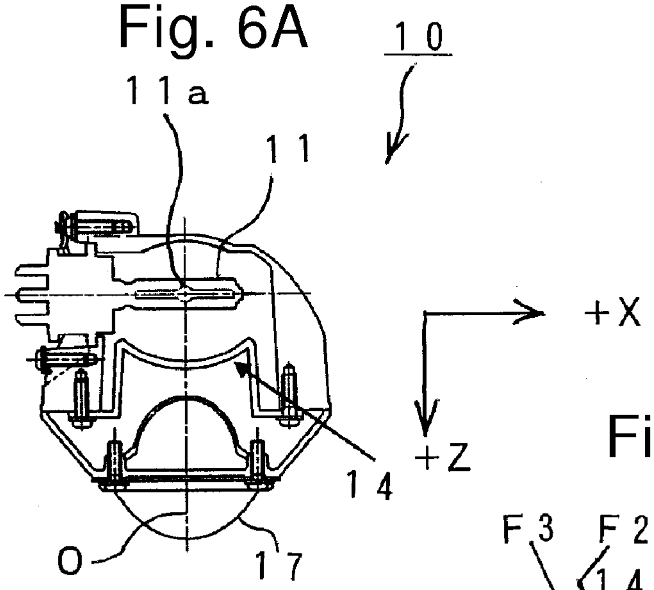
Fig. 6C
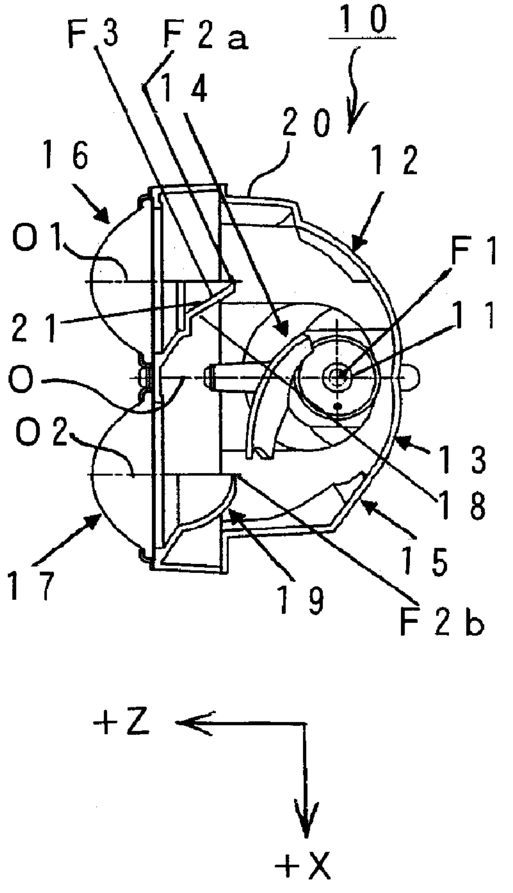
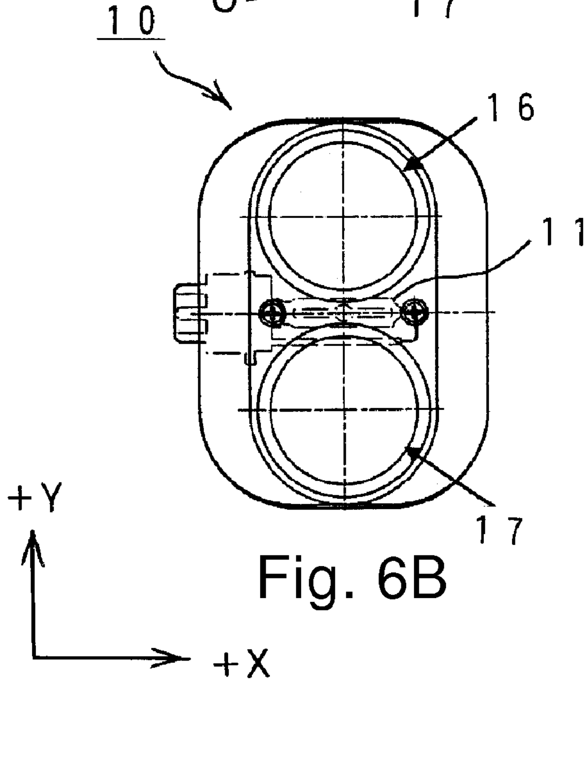
Fig. 6B

Luminous intensity distribution viewed from front

Luminous intensity distribution viewed sideway

VEHICLE LIGHT

This application claims the priority benefit under 35 U.S.C. § 119 of Japanese Patent Application No. 2005-277161 filed on Sep. 26, 2005, Japanese Patent Application No. 2006-027808 filed on Feb. 6, 2006, and Japanese Patent Application No. 2006-112915 filed on Apr. 17, 2006, which are hereby incorporated in their entirety by reference.

BACKGROUND

1. Field

The presently disclosed subject matter relates to a vehicle light used as a headlight, an auxiliary headlight, a signal light, vehicle or traffic light, and the like.

2. Description of the Related Art

FIG. 1A and FIG. 1B show a conventional projector type vehicle headlight.

The vehicle headlight 1 shown here is configured as a single light fixture. The vehicle headlight 1 is configured to include a bulb 2 serving as a light source, an elliptical reflecting surface 3, a projection lens 4, and a light shielding shutter 5. The elliptical reflecting surface 3 has a first focus F1. The light emission center of the bulb 2 is positioned close to the first focus F1. In addition to this, the elliptical reflecting surface 3 is arranged such that the major axis thereof coincides with the optical axis of the bulb 2 and reflects light from the bulb 2 towards the front. The projection lens 4 is arranged such that the position of the focus thereof on the light source side is positioned close to the position of a second focus F2 of the reflecting surface 3. This configuration allows the projection lens 4 to focus light from the bulb 2 or the reflecting surface 3. The light shielding shutter 5 is arranged within the light path from the bulb 2 to the projection lens 4 as well as close to the second focus F2 of the reflecting surface 3 to shield part of the irradiated light and form a cutoff portion in the light distribution.

In this instance, the vehicle headlight 1 utilizes a bulb referred to as a C-8 light source for the bulb 2. The bulb 2 is arranged facing forward such that the center axis thereof extends towards the front almost horizontally coinciding with the optical axis of the projection lens 4.

The intensity distribution of the C-8 light source is comparatively low in the front and back end portions (longitudinal direction) and is also comparatively high in the upper/lower and left/right directions (the radial direction, e.g., the directions perpendicular to the longitudinal direction).

Therefore, the bulb 2 is installed from the rear of the reflecting surface 3 and the light that is emitted in this perpendicular direction (radial direction) is reflected on the reflecting surface 3 towards the front. Because of this, the light intensity of the irradiated light is strengthened.

The projection lens 4 is, for example, formed from a convex lens with an aspheric surface and is secured and maintained in position with respect to the reflecting surface 3 through a lens holder 6. The light shielding shutter 5 is installed between the reflecting surface 3 and the lens holder 6.

The light emitted from the bulb 2 in the vehicle headlight 1 with this type of configuration either is directly incident on the projection lens 4 or is reflected on the reflecting surface 3 and then incident on the projection lens 4 after being focused towards the second focus F2 of this reflecting surface 3. The incident light is focused by the projection lens 4 and is then irradiated towards the front.

At this time, part of the light incident on the projection lens 4 is blocked by the light shielding shutter 5. Thus, a cutoff portion is formed in the light distribution pattern without glaring light being presented to opposing vehicles. In other words, desired light distribution properties (refer to FIG. 2) are obtained which shorten the irradiation distance on the opposing driving lane. A so-called passing-by beam (hereinafter referred to as a low beam) is thus formed.

When forming a travel beam (hereinafter referred to as a high beam), the light shielding shutter 5 is removed from the light path so that a cutoff portion is not formed.

The C-8 light source bulb in the vehicle headlight 1 with this type of configuration is arranged facing forward with the lengthwise direction of the bulb coinciding with the optical axis. Because of this, the length of the entire light fixture in both the forward and rearward directions becomes comparatively longer requiring a large installation space with respect to the body of the vehicle. In addition, the degree of freedom in which the installation can be performed is reduced placing restrictions on the body design of the vehicle.

In particular, when using a high intensity discharge (HID) light source as the bulb 2, a comparatively large power feed socket incorporating one portion of the igniting device is required in order to drive and illuminate the HID light source. For this case, the length of the HID light source itself in the longitudinal direction is approximately 100 mm. Consequently, the length of the entire vehicle headlight 1 is approximately 180 mm.

The overhang (portion stretching from the axle to the end of the vehicle) of the front of a vehicle in modern automobiles is short. In addition, vehicle body shapes which take into consideration aerodynamic performance and round off the four corners of the vehicle body to greatly reduce the surface area are often used. There are also trends to combine wide tires that have a large oblateness and large diameter wheels. These cause severe restrictions on the installation space required to install a vehicle headlight. This has resulted in greater demands to shorten vehicle headlights in at least the longitudinal direction.

On the other hand, from the viewpoint of improvements to safety and differentiation of performance, the installation ratio of HID light sources which are longitudinally long is often desired in order to increase the light intensity. In recent years, the use of headlights with variable light distribution for curved paths have come to be recognized as adaptive front lighting systems (AFS). In response to this, projector type vehicle headlights are often used because of requests for smaller illumination surfaces.

In contrast to this, Japanese Patent Laid-Open Publications Nos. 2004-127830 and 2005-100766 disclose vehicle headlights with bulbs facing sideways in the longitudinal direction and arranged lower than the optical axis of the projection lens. Therefore, arranging the bulb sideways makes it possible to shorten the entire length of the light fixture.

In this type of projector type vehicle headlight, a diffusion region is formed in the light distribution pattern by the region on the side of the optical axis of the reflecting surface, reflecting light from the bulb and then guiding it to the projection lens. In this vehicle headlight, the bulb is arranged lower than the optical axis, and is inserted inside the light fixture from the side. Consequently, notching is not needed in the region on the side of the optical axis of the reflecting surface. This makes it possible to form a diffusion region that has a sufficient quantity of light without reducing the quantity of light of the diffusion region in the light distribution pattern.

In the vehicle headlight disclosed in Japanese Patent Laid-Open Publications Nos. 2004-127830 and 2005-100766, however, the bulb is arranged sideways, thereby shortening the length of the entire vehicle headlight in the direction of the optical axis and resulting in a shorter configuration in the lengthwise direction overall.

When using an HID light source as a bulb however, the shortening effect due to the bulb facing sideways is approximately 50 mm.

Because of this, it is difficult to respond to demands for smaller designs for vehicle headlights as described above, which result in even smaller designs as are being asked for.

When using an HID light source with the bulb arranged sideways, the light in the direction of the center axis with the strongest light intensity is irradiated onto the diffusion region without being irradiated towards the area close to the center in the forward direction. This results in light utilization efficiency from the bulb dropping and the strongest light intensity close to the center in the light distribution pattern becoming lower.

From among the light irradiated from the bulb towards the front, the light that is not incident on the projection lens is not included in the irradiation light irradiating towards the front. Because of this, there is no contribution to the formation of the light distribution pattern, thereby resulting in the overall luminous flux becoming insufficient.

For an HID light source, the length in the optical axis direction of the light fixture can only be shortened approximately 50 mm even when the bulb is placed sideways. This makes it difficult to achieve significant shortening in the depth.

A vehicle headlight with variable light distribution is disclosed in Japanese Patent Laid-Open Publication No. 2005-166282. A dedicated reflecting surface for variable light distribution, a projection lens, and a movable reflecting surface are added to this vehicle headlight. The movable reflecting surface is opened and closed to vary the light distribution, thereby avoiding abrupt changes in the shape of the light distribution. In this headlight however, since the light source is arranged along the optical axis, shortening of the depth in the direction of the optical axis is not achieved.

In contrast, FIG. 3 shows a conventional vehicle headlight of a so-called longitudinal type. The vehicle headlight 1 is configured as a single light fixture. The vehicle headlight 1 is configured to include a bulb 2 serving as a light source, a parabolic reflecting surface 3, and a front lens 4. The parabolic reflecting surface 3 has a focus F. The light emission center of the bulb 2 is positioned close to the focus F at this time. In addition to this, the parabolic reflecting surface 3 is arranged such that the major axis extends almost horizontally towards the irradiation direction of the light. Therefore, the parabolic reflecting surface 3 reflects light from the bulb 2 towards the front. The front lens 4 is located in front of the bulb 2 and is arranged almost perpendicular to the optical axis.

The bulb 2 utilizes the bulb referred to as the C-8 light source mentioned above. The bulb 2 is arranged facing sideways from the side such that the center axis extends towards the front almost horizontally perpendicular with optical axis of the projection lens.

The intensity distribution of the C-8 light source is comparatively low at the front and rear sides (longitudinal direction along the x-axis) and is also comparatively high in the upper/lower and left/right directions (perpendicular directions in the y and z-axes).

The reflecting surface 3 is formed into a comparatively narrow longitudinal shape matching the longitudinal shape of the entire vehicle headlight 1. Because of this, the reflecting surface 3 is not well suited to obtain light distribution properties which spread out horizontally left and right.

By providing a lens cut 4*a* that takes into consideration the characteristics of the reflecting surface 3, the front lens 4 radiates light reflected by the reflecting surface 3 as well as direct light from the bulb 2 in the horizontal direction left and right.

The light emitted from the bulb 2 in the vehicle headlight 1 with this type of configuration is either directly incident on the projection lens 4 or is reflected by the reflecting surface 3, forming an almost parallel light and then is incident on the projection lens 4. The incident light is radiated in the horizontal direction left and right by the projection lens 4 and is then irradiated towards the front.

The reflecting surface 3 in the conventional configuration of the longitudinal type vehicle headlight 1 described above also has a longitudinal shape and a narrow width. Because of this, the quantity of the incident light emitted from the bulb 2 reflecting incident to the reflecting surface 3 is reduced and the light utilization efficiency of the bulb drops.

For example, when using a tungsten halogen lamp as the bulb 2 in the configuration described above, the greatest brightness in the light distribution pattern is approximately 260 lm which is comparatively dark as shown in FIG. 4A.

In this type of conventional vehicle headlight 1, the light reflected by the longitudinal reflecting surface 3 is radiated in the horizontal direction left and right by the front lens 4. Therefore, a lens cut 4*a* in the front lens 4 that radiates in the horizontal direction left and right is essential. This results in less freedom in the design of the lens.

When the front lens 4 is arranged in an almost perpendicular manner, an appropriate light distribution pattern is obtained as shown in FIG. 4A. When the design is such that the front lens 4 is arranged at a slant, the light distribution region in the region at both ends of the light distribution pattern will fall downward or rise upward as shown in FIG. 4B. As a result, this light distribution pattern is not suitable as a light distribution pattern for a vehicle headlight.

In contrast to this, the use of a so-called C-6 light source in which the longitudinal direction of the light emitting portion is positioned at a right angle to the optical axis is also considered. Even though this light source is used, the incident efficiency towards the reflecting surface 3 worsens and the light utilization efficiency drops. For this case, it is difficult to obtain a bright light distribution pattern together with a low incident reflection efficiency due to the narrow width of the reflecting surface 3.

SUMMARY

Considering the points described above, an aspect of the disclosed subject matter includes a projector type vehicle light with a bulb placed in a transverse manner so as to shorten the depth of the entire light fixture without reducing the brightness while using a simple configuration.

Another aspect of the disclosed subject matter includes a longitudinally designed vehicle light that has a degree of freedom in design, such as the ability to incline the front with a suitable light distribution pattern, while using a simple configuration.

Another aspect of the disclosed subject matter is a vehicle light that can include a light source having a light emitting portion in a longitudinal direction, the light source being arranged on an optical axis extending horizontally in a front-to-rear direction of a vehicle so that the longitudinal direction intersects the optical axis with a certain angle; a first projection lens with a convex shape, arranged in front of the light source in an irradiation direction and above the optical axis; a second projection lens with a convex shape, arranged in front of the light source in the irradiation direction and below the optical axis; a first elliptical reflecting surface arranged above the optical axis, the first elliptical reflecting surface having a first focus substantially at the light emitting portion of the light source and a second focus substantially at a rear focus of the first projection lens, the first elliptical reflecting surface reflecting light emitted backward and upward from the light source to focus the light toward the rear focus of the first projection lens; a second elliptical reflecting surface arranged below the optical axis, the second elliptical reflecting surface having a first focus substantially at the light emitting portion of the light source and a second focus substantially at a rear focus of the second projection lens, the second elliptical reflecting surface reflecting light emitted backward and downward from the light source to focus the light toward the rear focus of the second projection lens; a third reflecting surface arranged in front of the light source such that the surface does not interfere with incident light reflected from the first and second reflecting surfaces on the respective first and second projection lenses, the third reflecting surface reflecting light emitted forward from the light source toward an area below the light source; and a plane mirror arranged in the area below the light source, for reflecting the light from the third reflecting surface toward the rear focus of the second projection lens. In the vehicle light with the configuration described above, the third reflecting surface may have a first focus arranged substantially at the light emitting portion of the light source and a second focus positioned at a position conjugate to the rear focus of the second projection lens by virtually placing the second focus by action of the plane mirror.

In this vehicle light configured as described above, at least one of the first and second reflecting surfaces may be composed of a combination of strip-shaped elliptical surfaces. Alternatively, at least one of the first and second reflecting surfaces may be composed of a free-curved surface based on an ellipse.

The vehicle light with the above configuration can further include a light shielding shutter provided to at least one of the first and second projection lenses, the light shielding shutter being arranged substantially at the rear focus of the corresponding projection lens, for forming a cut-off line to define a predetermined light distribution pattern.

In this case, the light shielding shutter may be formed as a plane surface perpendicular to the optical axis or be curved in an arc shape or an elliptical shape toward the front.

The vehicle light with the above configuration can further include: a fourth elliptical reflecting surface arranged in front of and above the first reflecting surface, the fourth elliptical reflecting surface having a first focus substantially at the light emitting portion of the light source and a second focus in front of the light shielding shutter, the fourth elliptical reflecting surface reflecting light emitted forward and upward from the light source to focus the light toward the front side of the light shielding shutter; and a reflecting plate arranged in front of and below the light shielding shutter, for reflecting the light from the fourth reflecting surface toward a direction corresponding an overhead sign.

In the vehicle light with the configuration as described above, the fourth reflecting surface may be composed of a combination of strip-shaped elliptical surfaces or a free-curved surface based on an ellipse.

Another aspect of the disclosed subject matter is a vehicle light that can include: a light source having a light emitting portion in a longitudinal direction, the light source being arranged on an optical axis extending horizontally in a front-to-rear direction of a vehicle so that the longitudinal direction intersects the optical axis with a certain angle; a first projection lens arranged in front of the light source in an irradiation direction and above or below the optical axis; a second projection lens arranged in front of the light source in the irradiation direction and on a tip end side of the light source; a first elliptical reflecting surface having a first focus substantially at the light emitting portion of the light source and a second focus substantially at a rear focus of the first projection lens, the first elliptical reflecting surface reflecting light emitted backward and upward or downward from the light source to focus the light toward the rear focus of the first projection lens; a second reflecting surface arranged in front of the light source, for reflecting light emitted forward from the light source to a region on the tip end side of the light source sideway; and a third reflecting surface arranged at the region on the tip end side of the light source, for reflecting light from the second reflecting surface toward a rear focus of the second projection lens.

In the vehicle light with the configuration as described above, the second reflecting surface may have a first focus arranged substantially at the light emitting portion of the light source and a second focus positioned at a position conjugate to the rear focus of the second projection lens by virtually placing the second focus by action of the third reflecting surface.

The vehicle light with the above configuration can further include: a third projection lens arranged in front of the light source and on the other side of the first projection lens with respect to the optical axis; and a fourth elliptical reflecting surface having a first focus substantially at the light emitting portion of the light source and a second focus substantially at a rear focus of the third projection lens, the fourth elliptical reflecting surface reflecting light emitted backward and downward or upward from the light source to focus the light toward the rear focus of the third projection lens.

The vehicle light with the above configuration can further include a light shielding shutter provided to at least one of the first, second, and third projection lenses, the light shielding shutter being arranged substantially at the rear focus of the corresponding projection lens, for forming a cut-off line to define a predetermined light distribution pattern.

In this case, the light shielding shutter may be formed as a plane surface perpendicular to the optical axis or be curved in an arc shape or an elliptical shape toward the front.

Also, in this case, at least one light shielding shutter may be provided with a slit for allowing light passing therethrough to irradiate an overhead sign, the slit being arranged forward away from the rear focus of the corresponding projection lens.

Still another aspect of the disclosed subject matter is a vehicle light that can include: a light source having a light emitting portion in a longitudinal direction, the light source being arranged on an optical axis extending horizontally in a front-to-rear direction of a vehicle so that the longitudinal direction intersects the optical axis with a certain angle; a first projection lens arranged in front of the light source in an irradiation direction and above the optical axis; a second projection lens arranged in front of the light source in the irradiation direction and below the optical axis; a third projection lens arranged in front of the light source in the irradiation direction and below the second projection lens; a first elliptical reflecting surface arranged above the optical axis, the first elliptical reflecting surface having a first focus substantially at the light emitting portion of the light source and a second focus substantially at a rear focus of the first projection lens, the first elliptical reflecting surface reflecting light emitted backward and upward from the light source to focus the light toward the rear focus of the first projection lens; a second elliptical reflecting surface arranged below the optical axis, the second elliptical reflecting surface having a first focus substantially at the light emitting portion of the light source and a second focus substantially at a rear focus of the second projection lens, the second elliptical reflecting surface reflecting light emitted backward and downward from the light source to focus the light toward the rear focus of the second projection lens; a first auxiliary reflecting surface arranged in front of the light source such that the surface does not interfere with incident light reflected from the first and second reflecting surfaces on the respective first and second projection lenses, the first auxiliary reflecting surface reflecting light emitted forward from the light source toward an area below the light source rearward; a second auxiliary reflecting surface arranged below the first auxiliary reflecting surface such that the surface does not interfere with incident light reflected from the second reflecting surface on the second projection lens and light reflected from the first auxiliary reflecting surface, the second auxiliary reflecting surface reflecting light emitted forward and downward from the light source toward an area behind the light source; a first plane mirror arranged below the second reflecting surface, for reflecting the light from the first auxiliary reflecting surface toward the rear focus of the third projection lens; and a second plane mirror arranged below the second reflecting surface, for reflecting the light from the second auxiliary reflecting surface toward the rear focus of the third projection lens.

In the vehicle light with the configuration as described above, the first auxiliary reflecting surface may have a first focus arranged substantially at the light emitting portion of the light source and a second focus positioned at a position conjugate to the rear focus of the third projection lens by virtually placing the second focus by action of the first plane mirror, and the second auxiliary reflecting surface may have a first focus arranged substantially at the light emitting portion of the light source and a second focus positioned at a position conjugate to the rear focus of the third projection lens by virtually placing the second focus by action of the second plane mirror.

The vehicle light with the above configuration can further include: a third elliptical auxiliary reflecting surface arranged in front of and above the first reflecting surface; and a third plane mirror arranged in front of the light source and above the first auxiliary reflecting surface such that the mirror does not interfere with incident light reflected from the first reflecting surface on the first projection lens, the third plane mirror reflecting light from the third auxiliary reflecting surface toward the first projection lens, and wherein the third auxiliary reflecting surface has a first focus arranged substantially at the light emitting portion of the light source and a second focus positioned at a position conjugate to the rear focus of the first projection lens by virtually placing the second focus by action of the third plane mirror.

The vehicle light with the above described configuration can further include a light shielding shutter provided to at least one of the first, second, and third projection lenses, the light shielding shutter being arranged substantially at the rear focus of the corresponding projection lens, for forming a cut-off line to define a predetermined light distribution pattern.

In this case, the light shielding shutter may be formed as a plane surface perpendicular to the optical axis or be curved in an arc shape or an elliptical shape toward the front.

Also in this case, at least one light shielding shutter may be provided with a slit for allowing light passing therethrough to irradiate an overhead sign, the slit being arranged forward away from the rear focus of the corresponding projection lens.

The vehicle light with the above configuration can further include: an elliptical reflecting surface for forming an overhead sign light distribution pattern, arranged in front of and above the first reflecting surface, the reflecting surface having a first focus substantially at the light emitting portion of the light source and a second focus at a position slightly forward the light shielding shutter and substantially at a rear focus of the first projection lens, the reflecting surface reflecting light emitted upward from the light source toward a position forward away from the rear focus of the first projection lens; and a reflecting plate arranged in front of the light shielding shutter at a position so that the reflecting plate reflect light from the reflecting surface for forming an overhead sign light distribution pattern toward an overhead sign to form the overhead sign light distribution.

In at least the above described aspects of the disclosed subject matter, at least one of the first, second, and third projection lenses may be composed of a Fresnel lens.

BRIEF DESCRIPTION OF THE DRAWINGS

These and other characteristics, features, and advantages of the disclosed subject matter will become clear from the following description with reference to the accompanying drawings, wherein:

FIGS. 1A and 1B are a cross sectional view and a longitudinal cross sectional view, respectively, along the optical axis, showing an example of a configuration of a conventional vehicle headlight;

FIG. 6A is a schematic plan view of the vehicle headlight in FIG. 5, seen from the +Y direction, FIG. 6B is a schematic front view seen from the +Z direction, and FIG. 6C is a longitudinal cross sectional view seen from the +X direction;

DETAILED DESCRIPTION OF EXEMPLARY EMBODIMENTS

Figure 2:
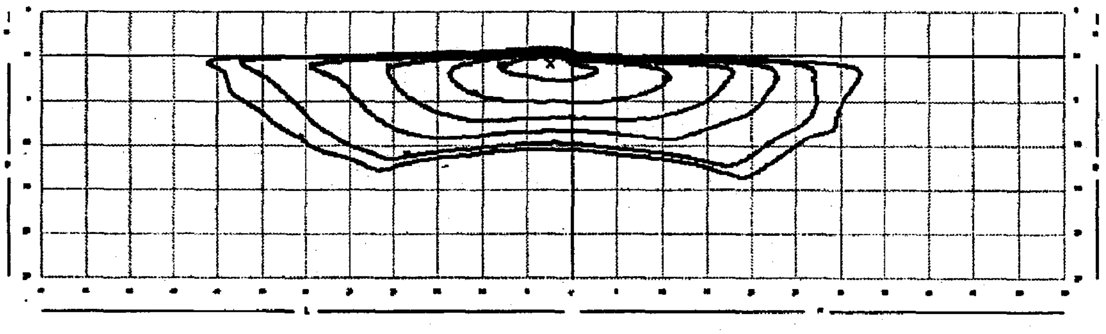
Fig. 2 Conventional Art
FIG. 2 is a graph showing a light distribution pattern in the vehicle headlight of FIGS. 1A and 1B.
Figure 3:
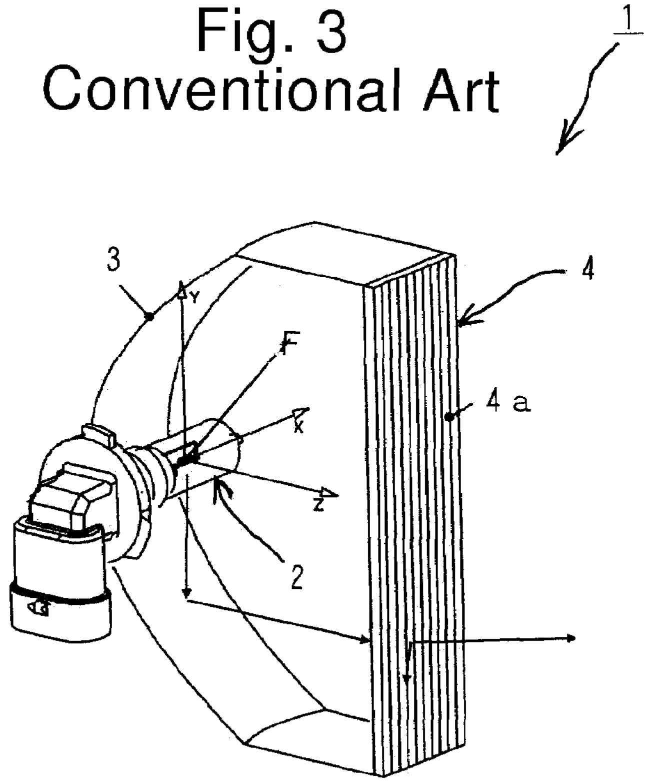
Fig. 3 Conventional Art
FIG. 3 is a schematic perspective view showing an example of a configuration of a conventional longitudinal vehicle headlight.

According to the configurations of the disclosed subject matter described above, light emitted from the light source over the rear side is reflected by the first reflecting surface, focused towards the second focus, namely the focus at the rear side of the first projection lens, and then slightly scattered and irradiated in a horizontal direction in a predetermined light distribution pattern towards the front through the first projection lens.

Further, light emitted from the light source under the rear side is reflected by the second reflecting surface, focused towards the second focus, namely the focus at the rear side of the second projection lens, and then similarly irradiated in a predetermined light distribution pattern towards the front through the second projection lens.

Even further, light emitted from the light source towards the front is incident on and reflected by the third reflecting surface and travels towards the rear slightly downward onto a plane mirror and is then reflected by this plane mirror. Thereafter, the light focused towards the focus at the rear of the second projection lens is then irradiated towards the front through the second projection lens.

Consequently, the light emitting from the light source towards the front is emitted by the second reflecting surface towards the front through the second projection lens. This improves the light utilization efficiency of the light from the light source and increases the total luminous flux that forms the light distribution pattern.

Because the light reflected by the third reflecting surface and the plane mirror is incident on the second projection lens at a comparatively small angle of incidence, the light is concentrated and irradiated comparatively close to the center towards the front. Therefore, the greatest brightness can be sufficiently improved close to the center of the light distribution pattern of the light that is irradiated towards the front.

Because this further improves the light utilization efficiency of the light from the light source, the total luminous flux that forms the light distribution pattern is increased even more together with the ability to increase the greatest brightness close to the center of the light distribution pattern of the light that is irradiated towards the front even more.

For this case, by arranging the light source sideways with respect to the optical axis, the entire light fixture of the vehicle headlight can be configured comparatively short and the light reflected by the first and second reflecting surfaces is irradiated towards the front through both the first and second projection lens. This makes it possible to obtain double the light concentration properties compared to irradiation from a single projection lens. Not only is the brightness of the light distribution pattern reduced but the diameter and the focal length of each projection lens can be designed to be smaller than a conventional single type vehicle headlight.

Therefore, making the focal length of each projection lens smaller makes it possible to reduce the length of the entire vehicle headlight in the direction of the optical axis even more. The height of the entire vehicle headlight can also be reduced by making the diameter of each projection lens smaller.

Furthermore, using a short focus projection lens makes it possible to obtain a light distribution pattern with a remarkably large spread in the horizontal direction, namely a light distribution pattern with a wide visible range, compared to a conventional projector type vehicle headlight and also to improve the safety even more.

In addition to this, by allowing the light from the light source to be distributed (divided) and incident on a plurality of projection lens, heat concentration on each projection lens is avoided. Because of this, temperature increases of each projection lens can be suppressed. Therefore, the distance between each projection lens and the light source can be set smaller making it possible to shorten the length of the entire vehicle headlight even more.

An original attractive outside appearance can also be presented by arranging a plurality of projection lens in a row.

When at least one of the first and second reflecting surfaces mentioned above is composed of a combination of strip-shaped vertical elliptical surfaces or a free-curved surface based on an ellipse, the first and second reflecting surfaces can be easily designed and formed.

Hereupon, a combination of strip-shaped vertical elliptical surfaces indicates a combination of multiple reflecting surfaces in which one portion of a rotated elliptical surface is cut long and narrow as if it were a short vertical strip.

In order to establish this type of strip-shaped vertical elliptical surface, at first, an elliptical first focus is placed in a light source and then a second focus is established matching a desired light distribution design (left/right angle of diffusion). Thereafter, by tracing beams of light in reverse from the emission side of an aspheric lens an imaginary focus curve of the aspheric lens that determines the position of the incident reflection towards the aspheric lens which corresponds to the left/right angle of diffusion is drawn and the shape of the rotated elliptical surface is found by shifting over to this imaginary focus curve. Then, the rotated elliptical surfaces which were found are divided into desired shapes (for example, shape of a short vertical strip that is small and narrow) and combined to form strip-shaped vertical elliptical surfaces.

When a light shielding shutter, which forms a cutoff line and produces a predetermined light distribution pattern, is arranged close to the focus at the rear side of at least one of the first and second projection lenses, the shadow of the light shielding shutter is projected towards the front by the light converged close to the focus at the rear side of this projection lens. Because of this, a cutoff line of a low beam is formed in the light distribution pattern, for example.

Furthermore, a cutoff line can be formed in the light distribution pattern based on the shape of the light shielding shutter when the light shielding shutter is formed in an arc shape or an elliptical shape that curves from a plane perpendicular to the optical axis or from the optical axis towards the front.

In addition, take a case where a fourth reflecting surface and a reflecting plate are provided, the first focus of the fourth reflecting surface can be arranged close to the light emission point of the light source on the upper front side of the first reflecting surface along with the second focus thereof being positioned at the front of the light shielding shutter where the second focus is arranged close to the focus at the rear of the first projection lens. In this case, the fourth reflecting surface can be composed of a concave elliptic system surface or possibly a combination of strip-shaped vertical elliptical surfaces or a free-curved surface based on an ellipse that reflects light emitted from this light source over the front and then focuses the light towards the front of the light shielding shutter is provided. The reflecting plate can be located below and at the front side of the light shielding shutter to reflect the light from the fourth reflecting surface and then irradiate the light in a direction that corresponds to an overhead sign. In this configuration, emitting light forward through the fourth reflecting surface and the reflecting plate makes it possible for light to irradiate a sign positioned over the front allowing the sign to be easily seen.

By shifting and arranging the second focus of the fourth reflecting surface away from the focus at the rear of the corresponding first projection lens, silhouettes of the light source image projected towards the front are blurred. Because of this, the dividing line between light and dark becomes dim thereby improving the visibility of overhead signs and other similar items.

When at least one of the first and the second projection lenses mentioned above is setup as a Fresnel lens, the depth of the projection lens can be shortened thereby making it possible to further shorten the length of the entire vehicle headlight in the direction of the optical axis.

According to the disclosed subject matter, the light utilization efficiency from the light source can be improved and the greatest brightness close to the center in the light distribution pattern is increased along with increasing the total luminous flux. This is achieved by arranging the light source facing sideways together with reflecting light emitted from the light source over the rear, under the rear, and towards the front on the first, second, and third reflecting surfaces and then focusing it towards the respective foci at the rear of the first and the second projection lenses.

In addition, because light from the light source is dispersed and incident on the first and second projection lenses, the diameter of each projection lens can be made smaller and focal length shortened as well. This makes it possible to reduce the size of each projection lens and also to reduce the entire size of the vehicle headlight or other light.

Even further, when the third reflecting surface is arranged between a light path of light that is reflected from the first reflecting surface and incident on the first projection lens and a light path of light that is reflected from the second reflecting surface and incident on the second projection lens, the third reflecting surface does not protrude in the transverse direction, making it possible to reduce the size of the vehicle headlight in a transverse direction as well.

And even further, by providing a fourth reflecting surface and a reflecting plate it is possible to irradiate light in a direction that corresponds to an overhead sign in a range from, for example, a horizontal line to 4 degrees upward even if a projector type vehicle headlight is used. This makes it possible to easily realize a minimum intensity of illumination in this region.

Furthermore, at least one of the light shielding shutters can be provided with a slit at a position corresponding to an overhead sign. When the slit is arranged and shifted forward from the focus at the rear of the corresponding projection lens, light can be emitted forward through the slit. This light can irradiate a sign positioned over the front, allowing the sign to be easily seen.

In this case, by shifting and arranging the slit away from the focus at the rear of the corresponding projection lens, silhouettes of the light source image through the slit projected towards the front are blurred. Because of this, the appearance of a quality light distribution pattern can be achieved.

Exemplary embodiments of the disclosed subject matter are configured such that a reflecting surface is provided in front of a light source to reflect light emitted from the light source upward, downward, or sideward as appropriate, to a corresponding reflecting surface that can reflect light to irradiate light in the irradiation direction. Therefore, the combination of a plurality of specially designed reflecting surfaces can constitute a longitudinal type or a transversal type vehicle light. In addition to this, the light source can be placed sideways and a light path can be compactly configured by the reflecting surfaces and lenses. This can reduce the entire size of the vehicle light (or other light) as well as improve the light utilization efficiency from the light source. Furthermore, the greatest brightness close to the center of the light distribution pattern can be increased.

In the following description, exemplary embodiments of the disclosed subject matter will be described in detail, with reference to FIG. 5 to FIG. 11.

Because the embodiments described below are examples of the disclosed subject matter, there are technical characteristics and various features. The scope of the disclosed subject matter is not particularly limited to the described examples in the following description and is not restricted to these modes.

In the exemplary embodiments below, the front direction is the +Z direction for the vehicle cross direction, the upward direction is the +Y direction for a direction perpendicular to the vehicle, and the outside from the center of the vehicle towards the side is the +X direction for the vehicle transverse direction.

Identical symbols are used for identical or similar members in each embodiment.

Figure 5:
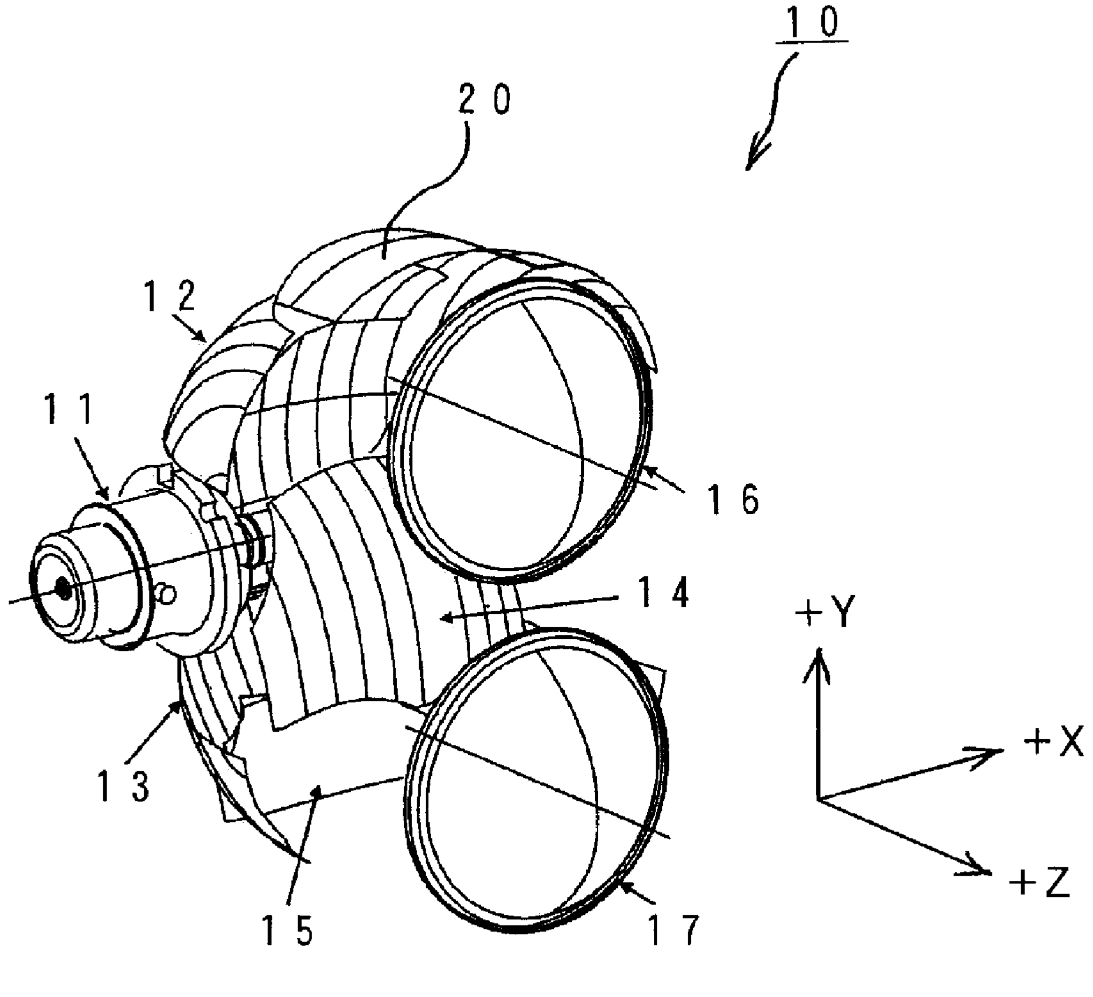
FIG. 5 is a schematic perspective view showing an example of a configuration of a vehicle headlight made in accordance with principles of the disclosed subject matter.

FIG. 5 and FIG. 6 show a configuration example of a vehicle headlight according to the disclosed subject matter.

In FIG. 5 and FIG. 6 the vehicle headlight 10 constitutes a headlight on the left side of an automobile, for example. The vehicle headlight 10 is configured to include: a bulb 11 serving as a light source; a first reflecting surface 12 and a second reflecting surface 13 which reflect light from the bulb 11 towards the front; a third reflecting surface 14 arranged facing the rear in front of the bulb 11; a plane mirror 15 that reflects light reflected from the third reflecting surface 14 towards the front; a first projection lens 16 and a second projection lens 17; a first light shielding shutter 18 and a second light shielding shutter 19; a fourth reflecting surface 20 arranged over the front of the first reflecting surface 12; and a reflecting plate 21 that reflects light reflected from the fourth reflecting surface 20 upward towards the front.

The bulb 11 can be a bulb generally used as a headlight or an auxiliary headlight of an automobile or other vehicle. For example, bulbs such as incandescent lamps, tungsten halogen lamps, or discharge lamps including metal halide lamps can be used. The bulb 11 is securely held by a socket which also supplies power to the bulb 11.

For the exemplary embodiment illustrated here, an HID light source with a length of approximately 100 mm can be used as the bulb 11.

As shown in FIG. 6A, the bulb 11 is arranged almost sideways with respect to the optical axis O that extends horizontally in the front-to-rear direction of the vehicle. The distal end of the bulb also extends towards the outside of the side of the vehicle (in other words, in the +X direction). In addition to this, the bulb 11 can also be arranged such that the emission center 11*a* is positioned substantially on the optical axis O. When installing the bulb 11, it is inserted from the center of the vehicle, namely from the −X side inside the engine compartment and then securely held.

The first reflecting surface 12 is arranged over (region in the +Y direction) the rear (region in the −Z direction) of the bulb 11.

As shown in FIG. 6C, the first reflecting surface 12 can be composed of an elliptical reflecting surface that is concave towards the front so as to reflect light emitted upward and rearward from the bulb 11 towards the front (+Z direction). This elliptical reflecting surface 12 has a first focus F1 and a second focus F2*a*. The light emission center 11*a* of the bulb 11 can be positioned close to the first focus F1. The second focus F2*a* can be positioned in front and over the optical axis O.

The illustrated elliptical reflecting surface can include an elliptical surface, a rotated elliptical surface, an elliptic cylinder, a free-curved surface based on an elliptical surface, combinations of the above, etc.

The first projection system is composed of the bulb 11, the first reflecting surface 12, the first projection lens 16, and the first light shielding shutter 18. Through this first projection system, light emitted from the bulb 11 in the −Z direction as well as upward is reflected by the first reflecting surface 12 and then travels towards a rear focus of the first projection lens 16 (described later). The light then passes near the first light shielding shutter 18, penetrates the first projection lens 16, and is emitted towards the front direction.

The second reflecting surface 13 is arranged under (region in the −Y direction) the rear (region in the −Z direction) of the bulb 11.

As shown in FIG. 6C, the second reflecting surface 13 can be composed of an elliptical reflecting surface that is concave towards the front so as to reflect light emitted rearward and downward from the bulb 11 towards the front. This elliptical reflecting surface 13 has a first focus F1 and a second focus F2*b*. The light emission center 11*a* of the bulb 11 can be positioned close to the first focus F1. The second focus F2*b* can be positioned in front and under the optical axis O.

The second projection system is composed of the bulb 11, the second reflecting surface 13, the second projection lens 17, and the second light shielding shutter 19. Through this second projection system light emitted from the bulb 11 in the −Z direction as well as downward is reflected by the second reflecting surface 13 and then travels towards a rear focus of the second projection lens 17 (described later). The light then passes near the second light shielding shutter 19, penetrates the second projection lens 17, and is emitted towards the front.

The first reflecting surface 12 and the second reflecting surface 13 described above can be composed of a combination of rotated elliptical surfaces shaped like short vertical strips or a free-curved surface based on an ellipse. In order to provide a higher degree of design freedom, the reflecting surface may be divided above and below the optical axis of each of the first and the second projection lenses 16 and 17 so that the divided reflecting surfaces with partially different curvatures can be combined.

The combination of strip-shaped elliptical surfaces indicates a combination of multiple reflecting surfaces in which one portion of a rotated elliptical surface is cut long and narrow as if it were a short vertical strip. In order to establish this type of strip-shaped elliptical surface, at first, an elliptical first focus can be placed in a light source and then a second focus can be established matching a desired light distribution design (left/right angle of diffusion). Thereafter, by tracing beams of light in reverse from the emission side of an aspheric lens an imaginary focus curve of the aspheric lens that determines the position of the incident reflection towards the aspheric lens which corresponds to the left/right angle of diffusion is drawn and the shape of the rotated elliptical surface is found by shifting over to this imaginary focus curve. Then, the rotated elliptical surfaces which were found are divided into desired shapes (for example, shape of a short vertical strip that is small and narrow) and combined to form strip-shaped vertical elliptical surfaces.

The name for this combination of strip-shaped elliptical surfaces in the presently disclosed subject matter is contained in a concept declared as a multiple combination of elliptical surfaces. This concept combines portions of a subdivided rotated elliptical surface found by the method described above. Therefore, the shape of the subdivided rotated elliptical surface is not always limited to a short vertical strip shape but can be many different shapes.

The first reflecting surface 12 and the second reflecting surface 13 are not only configured to diffuse light in the direction of the optical axis O but also to generate diffused light in the horizontal direction towards both the left and right taking into consideration the road surface irradiation of the light distribution pattern.

In this illustrated example, the first reflecting surface 12 is provided with a reflecting surface used to form a so-called hot zone in a region positioned above the bulb 11.

Next, the third reflecting surface 14 will be described.

The third reflecting surface 14 is arranged in front (region in the +Z direction) of the bulb 11 at a position that does not interfere with the incident light reflected from the reflecting surfaces 12 and 13 onto the projection lenses 16 and 17. It can also be arranged on the optical axis O.

The third reflecting surface 14 can be composed of an elliptical reflecting surface that is concave towards the rear direction so as to reflect light emitted from the bulb 11 to the front towards the rear as well as slanting downward. This elliptical reflecting surface has a first focus F1 and a second focus F2*c*. The light emission center 11*a* of the bulb 11 is positioned close to the first focus F1. The second focus F2*c* is designed such that it is positioned at a position conjugate to or substantially the same as the focus at the rear of the second projection lens 17 by virtually placing the focus F2*c* by means of the plane mirror 15.

Because of this, the light emitted from the bulb 11 in substantially the +Z direction is reflected by the third reflecting surface 14 and then further reflected by the plane mirror 15. The reflected light travels towards the focus at the rear of the second projection lens 17, passes near the second light shielding shutter 19, penetrates the second projection lens 17, and then emits towards the front.

The third reflecting surface 14 is configured, taking into consideration the road surface irradiation of the light distribution pattern, to generate not only the diffused light in the direction of the optical axis O, but also the diffused light in the horizontal direction towards both the left and right sides.

As shown in FIG. 6C, the plane mirror 15 is arranged in a region that corresponds to the optical axis of the second projection lens 17 and in a region under the bulb 11 (−Z direction). This plane mirror 15 can be integrally formed with the region under the second reflecting surface 13. The plane mirror 15 is installed at an angle of inclination such that it reflects the light reflected from the third reflecting surface 14 and directs the light towards the focus at the rear of the second projection lens 17.

The first projection lens 16 is composed of a convex lens, and possibly an aspheric lens. The focus at the rear (light source side) of the first projection lens 16 is configured such that it is positioned close to the second focus F2*a* of the first reflecting surface 12 above the optical axis O and on an optical axis O1 parallel to the optical axis O.

In the same manner, the second projection lens 17 is composed of a convex lens, and possibly an aspheric lens. The focus at the rear (light source side) of the second projection lens 17 is configured such that it is positioned close to the second focus F2*b* of the second reflecting surface 13 below the optical axis O and on an optical axis O2 parallel to the optical axis O.

The first light shielding shutter 18 can be formed from an opaque material. The upper edge 18*a* of the shutter 18 is arranged close to the focus at the rear (light source side) of the first projection lens 16. The first light shielding shutter 18 is designed such that the upper edge 18*a* of the shutter 18 forms a cutoff line in the light distribution pattern of, for example, a low beam. Furthermore, both sides of the first light shielding shutter 18 can be curved in an arc shape or an elliptical shape towards the corresponding first projection lens 16. In this case, the curved shape of the first light shielding shutter 18 is designed taking into consideration the diffusion state in the left/right horizontal directions of the light that is irradiated towards the front by the first projection lens 16. The first light shielding shutter 18 can also be formed in a flat shape.

The second light shielding shutter 19 can be formed from a opaque material. The upper edge 19*a* of the shutter 19 is arranged close to the focus at the rear (light source side) of the second projection lens 17. The second light shielding shutter 19 is designed such that the upper edge 19*a* of the shutter 19 forms a cutoff line in the light distribution pattern of, for example, a low beam. Furthermore, in the same manner as the first light shielding shutter 18, both sides of the second light shielding shutter 19 can be curved in an arc shape or an elliptical shape towards the corresponding second projection lens 17.

The fourth reflecting surface 20 is can be located away from the first projection lens 16 in front (region in the +Z direction) of the bulb 11 at a position that does not interfere with the incident light reflected from the first reflecting surface 12 onto first projection lens 16. As illustrated, although the fourth reflecting surface 20 is integrally formed with the front upper edge of the first reflecting surface 12, the disclosed subject matter is not limited to this configuration.

The fourth reflecting surface 20 can be composed of an elliptic reflecting surface that is concave facing downward so as to reflect light that is emitted from the bulb 11 to the front or upward towards the front as well as inclined downward. This elliptical reflecting surface has the first focus F1 and a second focus F3. The light emission center 11*a* of the bulb 11 is positioned close to the first focus F1. The second focus F3 is designed so as to be positioned slightly towards the front away from the focus at the rear of the first projection lens 16.

The reflecting plate 21 can be formed from a flat plate or a concave surface with a large radius of curvature. The reflecting plate 21 reflects light from the fourth reflecting surface 20 to form a so-called overhead sign region in order to satisfy the minimum intensity of illumination from the horizontal up to 4 degrees in the light distribution pattern.

Because of this, the light emitted towards the front as well as upward from the bulb 11 is reflected by the reflecting plate 21 after being reflected by the fourth reflecting surface 20 and then penetrates the first projection lens 16 and is emitted towards the front.

In order to shade silhouettes of the overhead sign region, the second focus of the fourth reflecting surface 20 can be arranged slightly shifted from the rear focus of the first projection lens 16 towards the front (+Z direction).

When the vehicle headlight 10 according to the exemplary embodiment configured as described above powers the bulb 11 and emits light, the irradiation light passes through a light path as described below.

Figure 7:
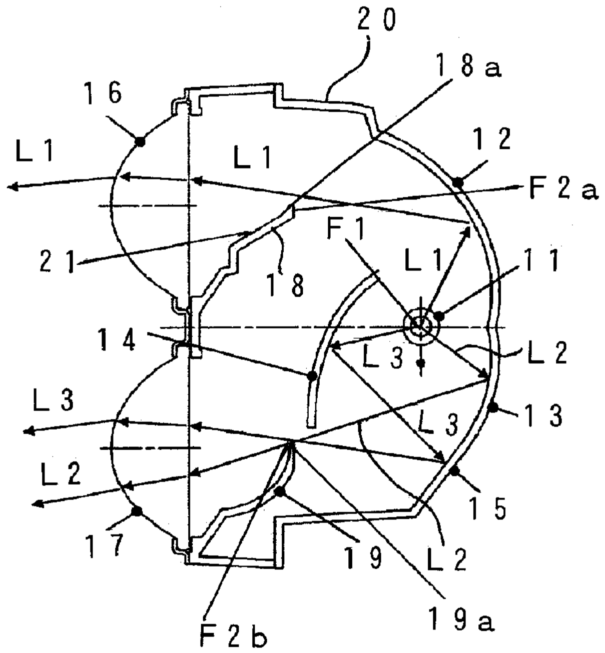
FIG. 7 is an explanatory view showing the optical action of a first projection system and a second projection system in the vehicle headlight of FIG. 5.

At first, in the first projection system as shown in FIG. 7, the light L1 that is emitted from the bulb 11 over the rear is reflected by the first reflecting surface 12 and travels towards the second focus F2*a* (namely, close to the focus at the rear of the first projection lens 16). This light L1 then passes near the first light shielding shutter 18 and is irradiated towards the front while being focused by the first projection lens 16.

The light L2 that is emitted from the bulb 11 under the rear in the second projection system is reflected by the second reflecting surface 13 and travels towards the second focus F2*b* (namely, close to the focus at the rear of the second projection lens 17). This light L2 then passes near the second light shielding shutter 19 and is irradiated towards the front while being focused by the second projection lens 17.

In addition, the light L3 that is emitted from the bulb 11 towards the front is reflected by the third reflecting surface 14 and then incident on the corresponding plane mirror 15. The light reflected by the plane mirror 15 travels towards a point close to the focus at the rear of the second projection lens 17. This light L3 then passes near the second light shielding shutter 19 and is irradiated towards the front while being focused by the second projection lens 17.

At this time, the light L1, L2, and L3 is partially blocked by the upper edges 18*a* and 19*a* of the first light shielding shutter 18 and the second light shielding shutter 19, respectively. The passing light, after being blocked and shaped, is magnified and projected towards the front by each of the projection lenses 16 and 17. This forms a cutoff line in the light distribution pattern and results in a low beam light distribution pattern.

The plane mirror 15 is positioned in the region of the optical axis O2 of the second projection lens 17. Therefore, the light L3 is incident on the second projection lens 17 in a comparatively narrow angular range and is irradiated towards the center of the region of the light distribution pattern.

Figure 8A:
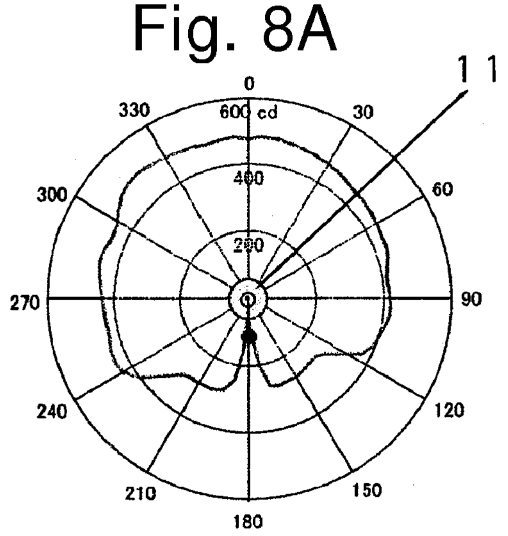
FIG. 8A is a graph showing luminous intensity distribution seen from the front of the light of FIG. 5
Figure 8B:
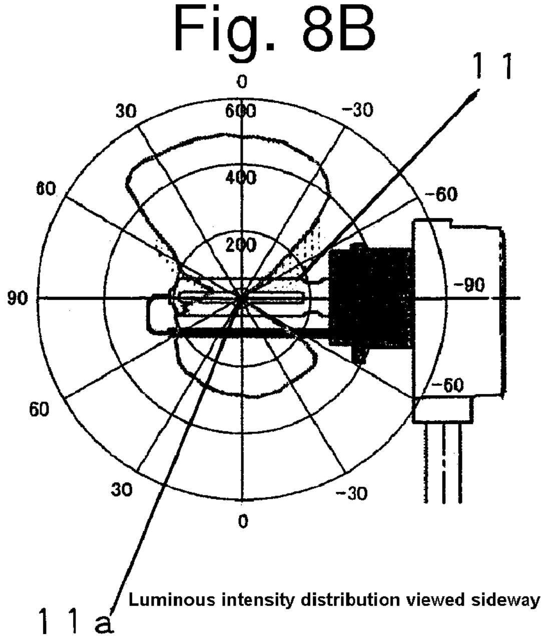
FIG. 8B is a graph showing luminous intensity distribution seen from the side of the light of FIG. 5.

Here, when the bulb 11 is an HID light source, there is a possibility that luminous material that does not change to a gas may remain inside the arc tube when normally lit. This remaining luminous material might block light emitted from the bulb 11 downward. If this occurs, the intensity of the luminous irradiation downward will sharply drop as shown in FIG. 8B. If the lower region of the second reflecting surface 13 is formed as the plane mirror 15, the light distribution pattern is not affected by the light L2 to that great of a degree.

Figure 9:
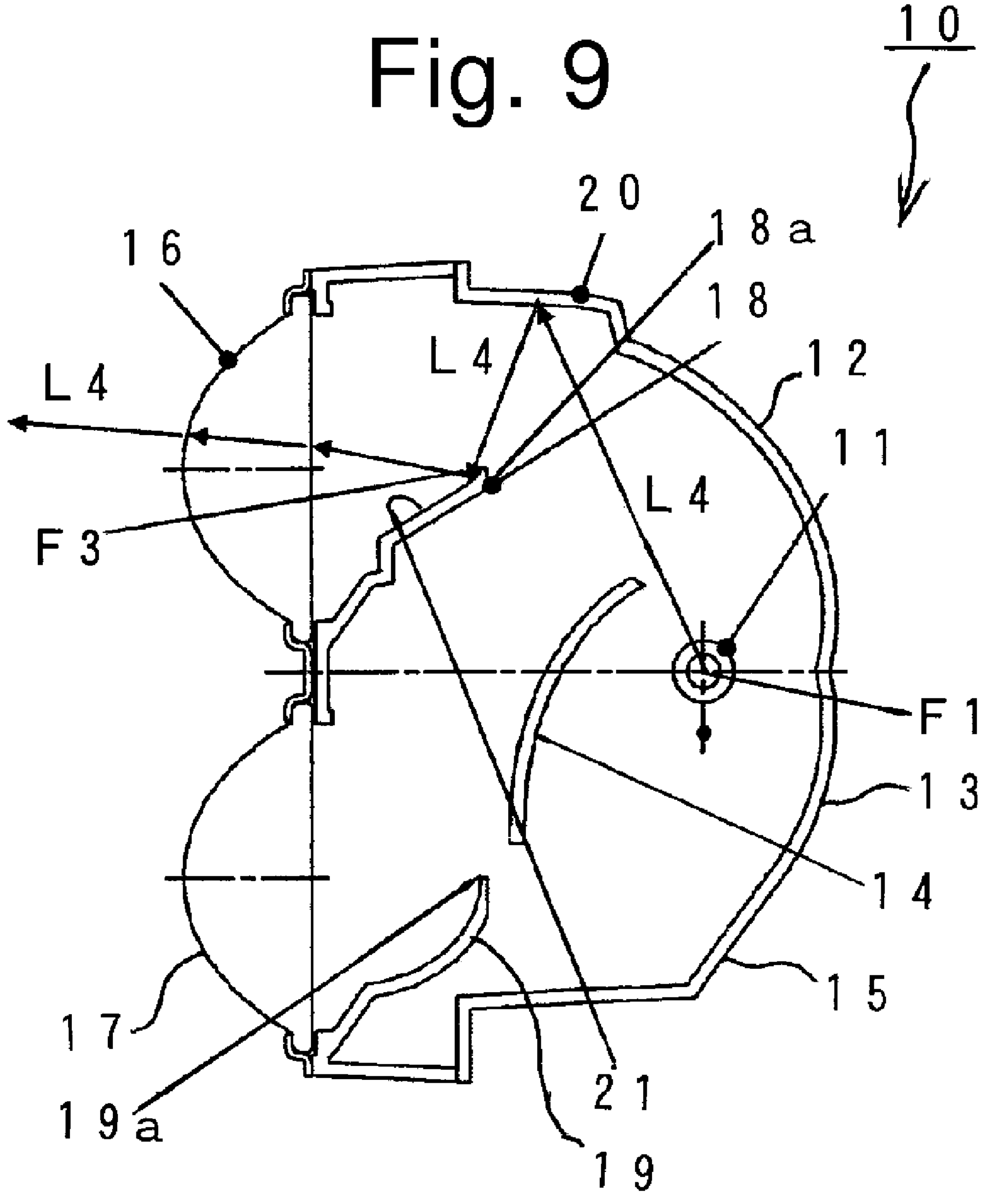
FIG. 9 is an explanatory view showing the optical action of a third projection system in the vehicle headlight of FIG. 5.

Even further, as shown in FIG. 9, light L4 that is emitted from the bulb 11 upward and frontward is reflected by the above-mentioned fourth reflecting surface 20 and slightly travels towards the front away from the second focus F3 (namely, the focus at the rear of the first projection lens 16). This light L4 is reflected by the reflecting plate 21 and is irradiated towards the front while being focused by the first projection lens 16.

By positioning the second focus of the fourth reflecting surface 20 at the front slightly away from the rear focus of the first projection lens 16 at this time, a so-called overhead sign region is blurred and projected. In other words, the light and dark boundary in the overhead sign region is blurred. Consequently, the light L4 can form the overhead sign region in the light distribution pattern and can be projected onto signs positioned over the front of the vehicle improving the visibility of the sign.

Taking into consideration a light distribution standard, a minimum intensity of illumination is sometimes required to be ensured in a range from a horizontal line to 4 degrees upward as an overhead sign region in order to allow signs positioned in front of and over a vehicle to be seen. The vehicle light according to the disclosed subject matter can satisfy the prerequisites of this standard.

Furthermore, arranging the bulb 11 facing sideways makes it possible to shorten the length of the entire fixture in the front-to-rear direction. Even further, the light from this bulb 11 is irradiated towards the front by the two projection systems. In other words, the light collecting properties can be doubled. Because of this, the focal length and the diameter of each of the projection lenses 16 and 17 can be made smaller. Therefore, each of the projection lenses 16 and 17 is configured in a small size thereby making it possible to further shorten the length of the vehicle headlight 10 in the direction of the optical axis as a whole as well as reduce the thickness in the upper/lower direction even more. Namely, the entire vehicle headlight 10 can be made smaller.

In addition, through the use of short focus projection lenses 16 and 17, a light distribution pattern with a wide range of visibility can be obtained and the safety can be maintained or possibly improved.

For example, the focal length of each of the projection lenses 16 and 17 can be designed to be approximately 15 to 40 mm which is shorter than the focal length of a projection lens in a conventional single type vehicle headlight and the diameter can be designed to be small at approximately 20 to 50 mm in the same manner.

In a conventional single projector type vehicle headlight with a bulb placed transversely, the depth was approximately 130 mm. In contrast to this, for the vehicle headlight 10 according to the disclosed subject matter, in addition to the above features, the focal length of the elliptical reflecting surfaces 12, 13, and 14 can be shortened together with a shortening of the entire length to 100 mm or less, for example.

By dispersing the light quantity incident on each of the projection lenses 16 and 17 in the vehicle headlight 10 with this type of configuration, the light quantity of each is almost reduced by half compared to a conventional single type vehicle headlight. Since the generation of heat in each of the projection lenses 16 and 17 is almost reduced by half in the same manner, each of the projection lenses 16 and 17 can be formed from a resin material.

In this instance, each of the projection lenses 16 and 17 can be configured as a Fresnel lens. This makes it possible to reduce the thickness of each of the projection lenses 16 and 17 in the direction of the optical axis by 10 mm or more and also to shorten the length of the entire vehicle headlight 10.

Figure 10A:
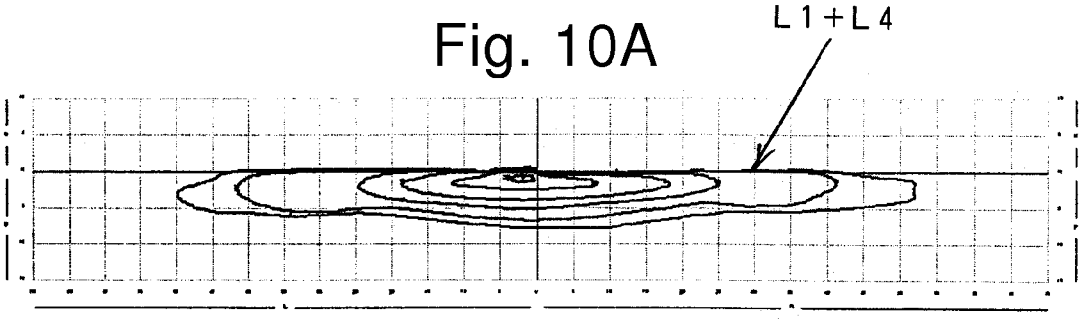
FIG. 10A is a graph showing a light distribution pattern according to the first projection system.
Figure 10B:
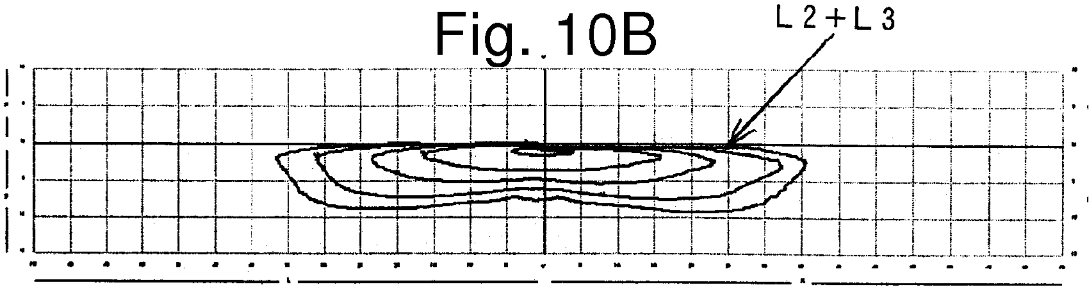
FIG. 10B is a light distribution pattern according to the second projection system.
Figure 10C:
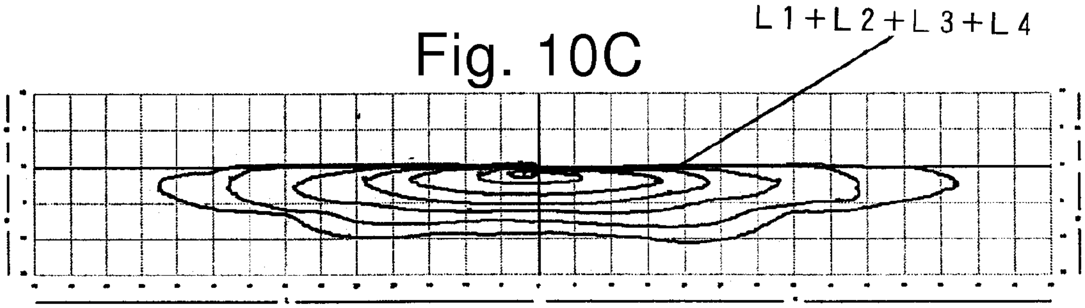
FIG. 10C is an entire light distribution pattern in the vehicle headlight of FIG. 5.

FIGS. 10A to 10C show simulation results of light distribution patterns according to the vehicle headlight 10.

FIG. 10A shows a light distribution pattern according to light L1 and light L4 in the first projection system. The light L1 from the bulb 11 is reflected by the first reflecting surface 12, penetrates the first projection lens 16, and is emitted towards the front. The light L4 is reflected by the fourth reflecting surface 20 and the reflecting plate 21, penetrates the first projection lens 16, and is emitted towards the front. For this case, it is understood that an overhead sign region is formed by the fourth reflecting surface 20 and the reflecting plate 21.

FIG. 10B shows a light distribution pattern according to light L2 and light L3 in the second projection system. The light L2 from the bulb 11 is reflected by the second reflecting surface 13, penetrates the second projection lens 17, and is emitted towards the front. The light L3 is reflected by the third reflecting surface 14 and the plane mirror 15, penetrates the second projection lens 17, and is emitted towards the front. For this case, it is understood that the light intensity close to the center of the light distribution pattern is improved by the third reflecting surface 14 and the plane mirror 15.

Figure 11:
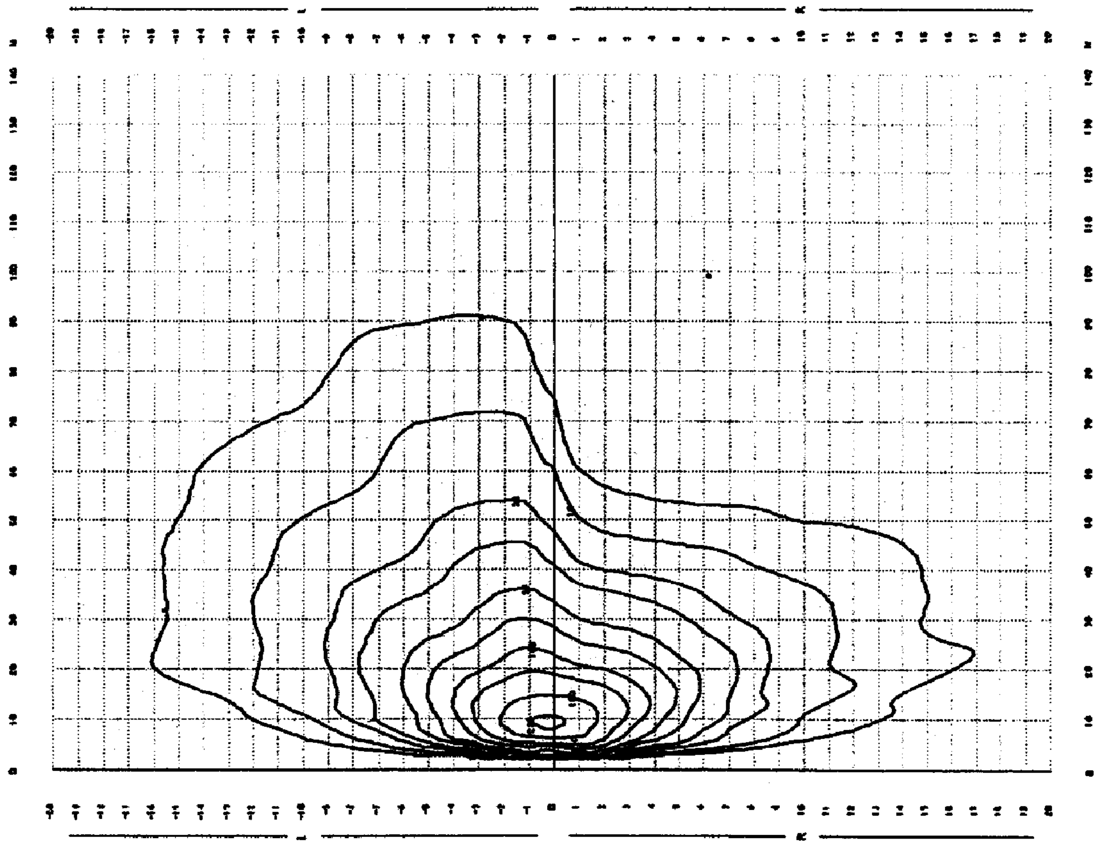
FIG. 11 is a graph showing a road surface light distribution pattern for the vehicle headlight of FIG. 5.
Figure 12:
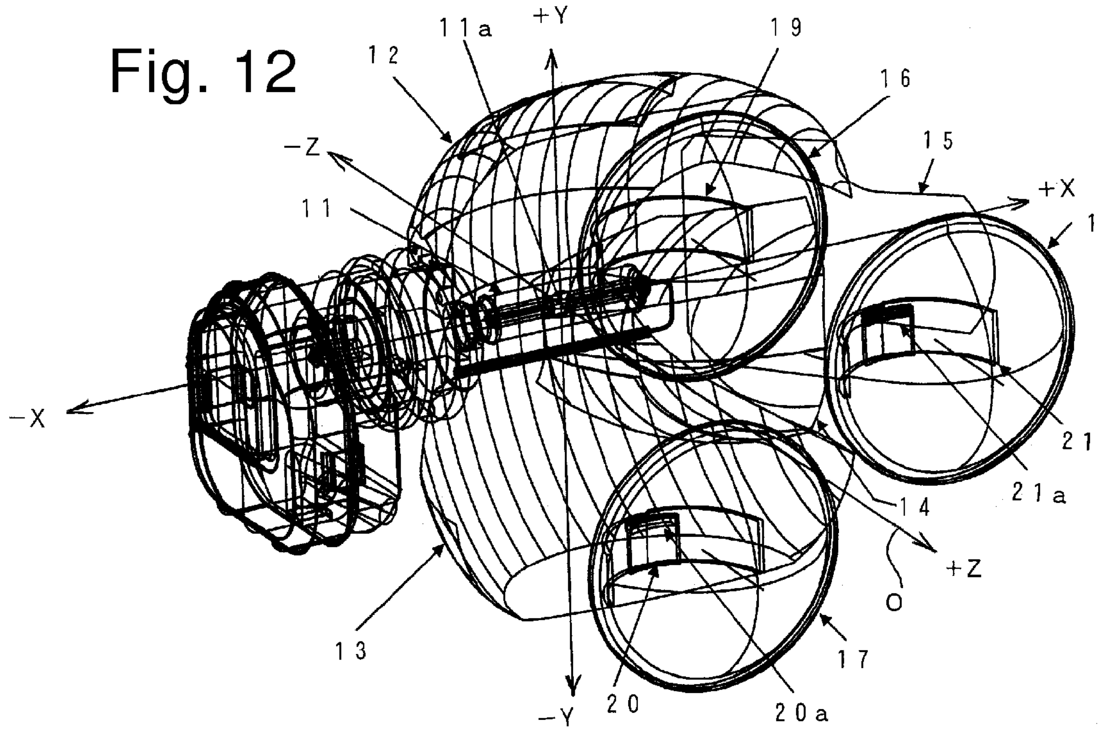
FIG. 12 is a schematic perspective view showing another example of a configuration of a vehicle headlight made in accordance with principles of the disclosed subject matter.

Consequently, the light distribution pattern of the entire vehicle headlight 10 according to light L1, L2, L3, and L4 is shown in the light distribution pattern of FIG. 10C and the road surface light distribution pattern of FIG. 11. As can be understood from these patterns, the total luminous flux increases together with the greatest brightness being sufficiently improved close to the center of the light distribution pattern. For the entire light distribution pattern a wide irradiation range is obtained at approximately 58 degrees to both the left and the right compared to an irradiation range of 35 to 40 degrees to both the left and the right according to a conventional vehicle headlight.

The light distribution pattern according to the disclosed subject matter can obtain a brightness equal to approximately 1100 lm compared to the entire light distribution pattern according to a conventional single type vehicle headlight. The diffusion properties to the left and right are also favorable and the visibility of an overhead sign can be ensured.

In the exemplary embodiment described above, although the vehicle headlight 10 is configured as a so-called double type, it is not limited to this. The first reflecting surface 12, the first projection lens 16, and the first light shielding shutter 18 can be omitted. In this case, reductions in the light utilization efficiency of light from the bulb 11 can be compensated by expanding the remaining second reflecting surface 13 and/or the third reflecting surface 14.

Furthermore, in the explanatory embodiment described above, although the first projection system and the second projection system are both equipped with the light shielding shutters 18 and 19 for low beam use, the disclosed subject matter is not limited to this. Any projection system can be configured for high beam use by omitting any of the light shielding shutters. Alternatively, a movable light shielding shutter can be used instead of the fixed light shielding shutter. In this case, both a high beam and a low beam can be formed in a single vehicle light.

Even further, in the exemplary embodiment described above, although an overhead sign region is formed in the light distribution pattern by the fourth reflecting surface 20 and the reflecting plate 21, the disclosed subject matter is not limited to this. The fourth reflecting surface 20 and the reflecting plate 21 can be omitted.

FIG. 12 to FIG. 15 show another example of a vehicle headlight made in accordance with principles of the disclosed subject matter.

In FIG. 12 to FIG. 15 the vehicle headlight 10 constitutes a headlight on the left side of an automobile, for example. The vehicle headlight 10 of this exemplary embodiment is configured to include: a bulb 11 serving as a light source; a first main reflecting surface 12 and a second main reflecting surface 13 which reflect light from the bulb 11 towards the front; a sub-reflecting surface 14 arranged facing the rear in front of the bulb 11; a plane mirror 15 that reflects light reflected from the sub-reflecting surface 14 towards the front; a first main projection lens 16, a second main projection lens 17, and a sub-projection lens 18; and a first main light shielding shutter 19, a second main light shielding shutter 20, and a sub-light shielding shutter 21.

The bulb 11 is adopted as the same as that used in the first exemplary embodiment, and for example, it may be an HID light source with a length of approximately 100 mm.

Figure 13:
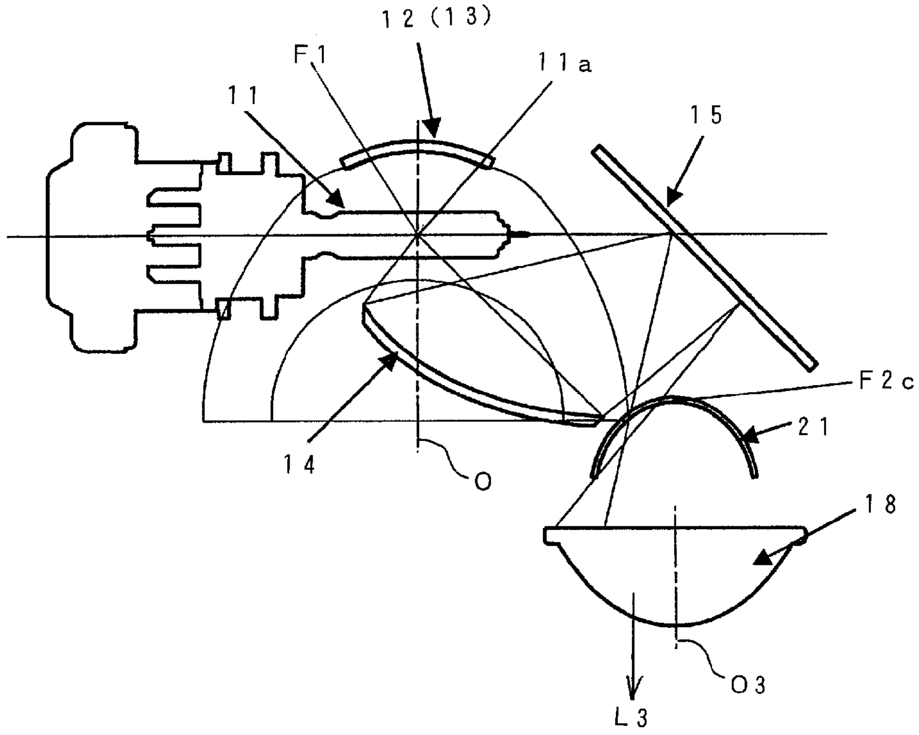
FIG. 13 is a schematic plan view of the vehicle headlight in FIG. 12, seen from the +Y direction.
Figure 14:
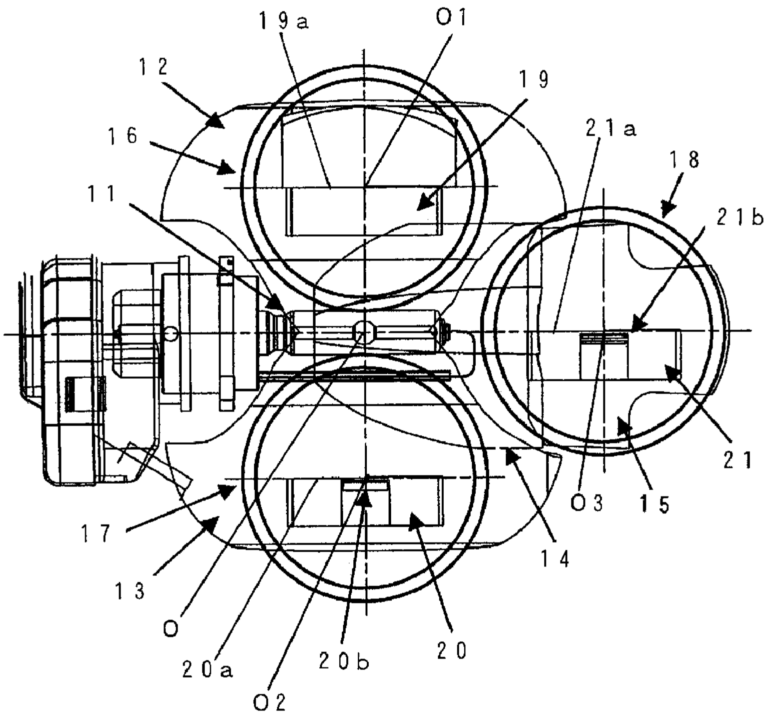
FIG. 14 is a schematic front view of the vehicle headlight in FIG. 12, seen from the +Z direction.

As shown in FIGS. 13 and 14, the bulb 11 is arranged almost sideways with respect to the optical axis O that extends horizontally in the front-to-rear direction of the vehicle and the distal end of the bulb also extends towards the outside of the side of the vehicle (in other words, in the +X direction). In addition to this, the bulb 11 can also be arranged such that the emission center 11*a* thereof is positioned on the optical axis O. When installing the bulb 11, it is inserted from the center of the vehicle, namely from the −X side inside the engine compartment and then securely held with a known means (not shown).

As in the first exemplary embodiment, the first main reflecting surface 12 is arranged over (region in the +Y direction) the rear (region in the −Z direction) of the bulb 11.

Figure 15:
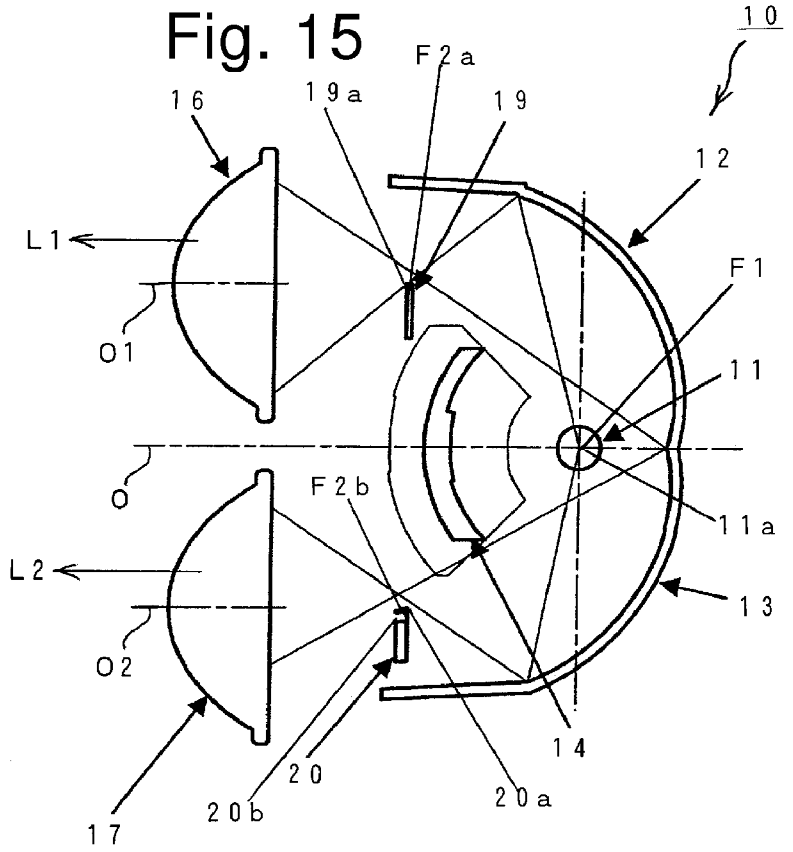
FIG. 15 is a longitudinal cross sectional view of the vehicle headlight in FIG. 12, seen from the +X direction.

As shown in FIG. 15, the first main reflecting surface 12 is composed of an elliptical reflecting surface that is concave towards the front so as to reflect light emitted upward and rearward from the bulb 11 towards the front (+Z direction). This elliptical reflecting surface 12 has a first focus F1 and a second focus F2*a*. The light emission center 11*a* of the bulb 11 is positioned close to the first focus F1. The second focus F2*a* is positioned in front and over the optical axis O.

Examples of the elliptical reflecting surfaces in the present exemplary embodiment may include those exemplified in the exemplary embodiment of FIG. 5.

Light emitted from the bulb 11 in the −Z direction as well as upward can be reflected by the first main reflecting surface 12 and then travel towards a rear focus of the first main projection lens 16 (described later). The light then passes near the first main light shielding shutter 19, penetrates the first main projection lens 16, and is emitted towards the front.

As in the exemplary embodiment of FIG. 5, the second main reflecting surface 13 of this exemplary embodiment is arranged under (region in the −Y direction) the rear (region in the −Z direction) of the bulb 11.

As shown in FIG. 15, the second main reflecting surface 13 is composed of an elliptical reflecting surface that is concave towards the front so as to reflect light emitted rearward and downward from the bulb 11 towards the front. This elliptical reflecting surface 13 has a first focus F1 and a second focus F2*b*. The light emission center 11*a* of the bulb 11 is positioned close to the first focus F1. The second focus F2*b* is positioned in front and under the optical axis O.

In this configuration, light emitted from the bulb 11 in the −Z direction as well as downward can be reflected by the second main reflecting surface 13 and then travel towards a rear focus of the second main projection lens 17 (described later). The light then passes near the second main light shielding shutter 20, penetrates the second main projection lens 17, and is emitted towards the front.

In this exemplary embodiment, the first main reflecting surface 12 and the second main reflecting surface 13 described above can actually be composed of a combination of strip-shaped elliptical surfaces shaped as in the previous exemplary embodiment, the details of which is omitted here because it is described hereinabove. The first main reflecting surface 12 and the second main reflecting surface 13 are also configured to diffuse light in the horizontal direction towards both the left and right. In addition to this, the first main reflecting surface 12 may be provided with a reflecting surface used to form a so-called hot zone as in the previous exemplary embodiment.

Next, the sub-reflecting surface 14 will be described.

The sub-reflecting surface 14 is arranged in front (region in the +Z direction) of the bulb 11 at a position that does not interfere with the incident light reflected from the main reflecting surfaces 12 and 13 onto the main projection lenses 16 and 17 as well as on the optical axis O.

The sub-reflecting surface 14 can be composed of an elliptical reflecting surface that is concave towards the rear so as to reflect light emitted from the bulb 11 to the front towards the rear as well as slanting downward. This elliptical reflecting surface has a first focus F1 and a second focus F2*c*. The light emission center 11*a* of the bulb 11 is positioned close to the first focus F1. The second focus F2*c* is designed such that it is positioned at a position (or near the position) conjugate to or substantially the same as the focus at the rear of the sub-projection lens 18 by virtually placing the focus F2*c* by means of the plane mirror 15.

Because of this, the light emitted from the bulb 11 in nearly the +Z direction is reflected by the sub-reflecting surface 14 and then further reflected by the plane mirror 15. The reflected light travels towards the focus at the rear of the sub-projection lens 18, passes near the sub-light shielding shutter 21, penetrates the sub-projection lens 19, and then emits towards the front.

The sub-reflecting surface 14 can be configured, taking into consideration the road surface irradiation of the light distribution pattern, to generate not only the diffused light in the direction of the optical axis O, but also the diffused light in the horizontal direction towards both the left and right sides.

As shown in FIG. 13, the plane mirror 15 is arranged in a region that corresponds to the extended line of the front-to-rear direction of the bulb 11 (+X direction). The plane mirror 15 is installed at an angle of inclination such that it reflects the light reflected from the sub-reflecting surface 14 and directs the light towards the focus at the rear of the sub-projection lens 18. In this exemplary embodiment, the angle is set to approximately 45 degrees as shown in FIG. 13.

It should be noted that the intensity distribution of the bulb 11 is comparatively low in the front and back end portions. Furthermore, the first and second main reflecting surfaces 12 and 13 are arranged so as to receive light from the bulb 11 within a range of approximately 55 degrees in the vertical direction with respect to the light emission center 11*a*. Since both the first and second main reflecting surfaces 12 and 13 are not arranged at the tip end side of the bulb 11, the plane mirror 15 does not interfere with the first and second main reflecting surfaces 12 and 13.

The first main projection lens 16 is composed of a convex lens, and possibly an aspheric lens. The focus at the rear (light source side) of the first main projection lens 16 is configured such that it is positioned close to the second focus F2*a* of the first main reflecting surface 12 above the optical axis O and on the optical axis O1 parallel to the optical axis O.

In the same manner, the second main projection lens 17 can be composed of a convex lens, and possibly an aspheric lens. The focus at the rear (light source side) of the second main projection lens 17 is configured such that it is positioned close to the second focus F2*b* of the second main reflecting surface 13 below the optical axis O and on the optical axis O2 parallel to the optical axis O.

In the same manner, the sub-projection lens 18 can be composed of a convex lens, and possibly an aspheric lens. The focus at the rear (light source side) of the sub-projection lens 18 is configured such that it is positioned laterally to the optical axis O (+X direction) and on an optical axis O3 parallel to the optical axis O. At the same time, the rear focus thereof is designed such that it is positioned at a position conjugate to or substantially the same as the second focus F2*c* of the sub-projection lens 14 (close to the focus) by virtually placing the rear focus by means of the plane mirror 15.

The first main light shielding shutter 19 can be formed from an opaque material. The upper edge 19*a* of the shutter 19 is arranged close to the focus at the rear (light source side) of the first main projection lens 16. The first main light shielding shutter 19 can be designed such that the upper edge 19*a* of the shutter 19 forms a cutoff line in the light distribution pattern of, for example, a low beam. Furthermore, both sides of the first main light shielding shutter 19 can be curved in an arc shape or an elliptical shape towards the corresponding first main projection lens 16. In this case, the curved shape of the first main light shielding shutter 19 is designed taking into consideration the diffusion state in the left/right horizontal directions of the light that is irradiated towards the front by the first main projection lens 16. The first main light shielding shutter 19 can also be formed in a flat shape.

The second main light shielding shutter 20 can also be formed from an opaque material. The upper edge 20*a* of the shutter 20 is arranged close to the focus at the rear (light source side) of the second main projection lens 17. The second main light shielding shutter 20 is designed such that the upper edge 20*a* of the shutter 20 forms a cutoff line in the light distribution pattern of, for example, a low beam. Furthermore, in the same manner as the first main light shielding shutter 19, both sides of the second main light shielding shutter 20 can be curved in an arc shape or an elliptical shape towards the corresponding second main projection lens 17.

Furthermore, the sub-light shielding shutter 21 is also formed from a opaque material. The upper edge 21*a* of the shutter 21 is arranged close to the focus at the rear (light source side) of the sub-projection lens 18. The sub-light shielding shutter 21 is designed such that the upper edge 21*a* of the shutter 21 forms a cutoff line in the light distribution pattern of, for example, a low beam. Furthermore, both sides of the sub-light shielding shutter 21 can be curved in an arc shape or an elliptical shape towards the corresponding sub-projection lens 18.

In this exemplary embodiment, the second main light shielding shutter 20 and the sub-light shielding shutter 21 are provided with slits 20*b* and 21*b*, respectively. These slits 20*b* and 21*b* can be used to form a so-called overhead sign region in order to satisfy the minimum intensity of illumination from the horizontal up to 4 degrees in the light distribution pattern. In order to shade silhouettes of the overhead sign region, the slits 20*b* and 21*b* are arranged slightly shifted towards the front (+Z direction).

When the vehicle headlight 10 according to the exemplary embodiment configured as described above powers the bulb 11 and emits light, the irradiation light can pass through a light path as described below.

At first, the light L1 that is emitted from the bulb 11 over the rear is reflected by the first main reflecting surface 12 and travels towards the second focus F2*a* (namely, close to the focus at the rear of the first main projection lens 16). This light L1 then passes near the first main light shielding shutter 19 and is irradiated towards the front while being focused by the first main projection lens 16.

The light L2 that is emitted from the bulb 11 under the rear is reflected by the second main reflecting surface 13 and travels towards the second focus F2*b* (namely, close to the focus at the rear of the second main projection lens 17). This light L2 then passes near the second main light shielding shutter 20 and is irradiated towards the front while being focused by the second main projection lens 17.

In addition, the light L3 that is emitted from the bulb 11 towards the front is reflected by the sub-reflecting surface 14 and then incident on the corresponding plane mirror 15. The light L3 reflected by the plane mirror 15 travels towards a point close to the focus at the rear of the sub-projection lens 18. This light L3 then passes near the sub-light shielding shutter 21 and is irradiated towards the front while being focused by the sub-projection lens 18.

At this time, the light L1, L2, and L3 is partially blocked by the upper edges 19*a*, 20*a*, and 21*a* of the first main light shielding shutter 18, the second main light shielding shutter 20, and the sub-light shielding shutter 21, respectively. The passing light, after being blocked and shaped, is magnified and projected towards the front by each of the projection lenses 16, 17, and 18. This forms a cutoff line in the light distribution pattern and obtains a light distribution pattern of a low beam.

In addition to this, the light L2 and L3 pass through the slits 20*b* and 21*b* of the shutters 20 and 21, respectively to form an overhead sign region in the light distribution pattern. Consequently, the light in the overhead sign region can be projected onto signs positioned over the front of the vehicle improving the visibility of the sign.

In the above configuration, the light emitted from the bulb 11 is divided into three, namely, light L1, L2, and L3. Further, it has been confirmed that the brightness of L2 and L3 is comparatively weaker than L1. Therefore, even if the overhead sign region is formed by light passing through the slits 20*b* and 20*c*, the intensity of illumination thereof may fall within certain requirements.

Since the light source is placed sideways, the length of the entire vehicle light can be shortened. Even further, the light from the bulb 11 is divided into three and light is projected towards the front by the three projection lenses 16, 17, and 18. In other words, the light collecting properties can be tripled. Because of this, the focal length and the diameter of each of the projection lenses 16, 17, and 18 can be made smaller. Therefore, each of the projection lenses 16, 17, and 18 is configured in a small size thereby making it possible to further shorten the length of the vehicle headlight 10 in the direction of the optical axis as a whole and the thickness in the upper/lower direction can also be reduced. Namely, the entire vehicle headlight 10 can be made smaller.

For example, the focal length of each of the projection lenses 16, 17, and 18 can be designed to be approximately 15 to 40 mm which is shorter than the focal length of a projection lens in a conventional single type vehicle headlight. The diameter thereof can be designed to be small (at approximately 20 to 50 mm) in the same manner.

In addition to the above configuration, the focal length of each of the elliptical reflecting surfaces 12, 13, and 14 can be shortened together with shortening the entire length of the vehicle headlight 10 according to the disclosed subject matter to 100 mm or less, for example.

By dispersing the light quantity being incident on each of the projection lenses 16, 17, and 18 in the vehicle headlight 10 with this type of configuration, the light quantity of each is almost reduced by one third compared to a conventional single type vehicle headlight. Since the generation of heat in each of the projection lenses 16, 17, and 18 is reduced by almost one third in the same manner, each of the projection lenses 16, 17, and 18 can be formed from a resin material.

In this instance, each of the projection lenses 16, 17, and 18 can be configured as a Fresnel lens. This makes it possible to reduce the thickness of each of the projection lenses 16, 17, and 18 in the direction of the optical axis by 10 mm or more and also to shorten the length of the entire vehicle headlight 10 even more.

Figure 16A:
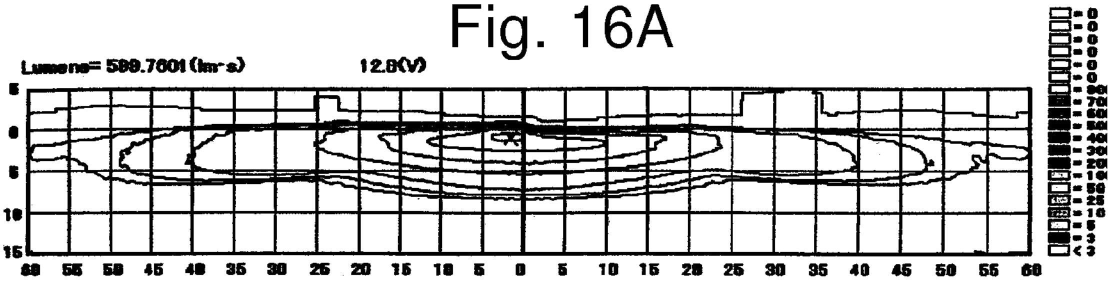
FIG. 16A is a graph showing a light distribution pattern according to a first projection system.
Figure 16B:
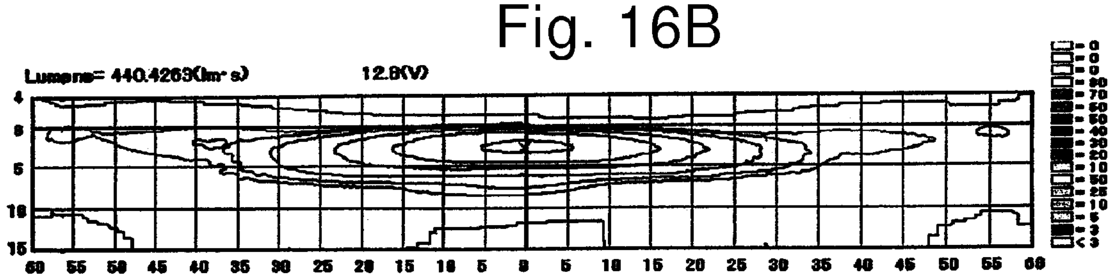
FIG. 16B is a light distribution pattern according to a second projection system.
Figure 16C:
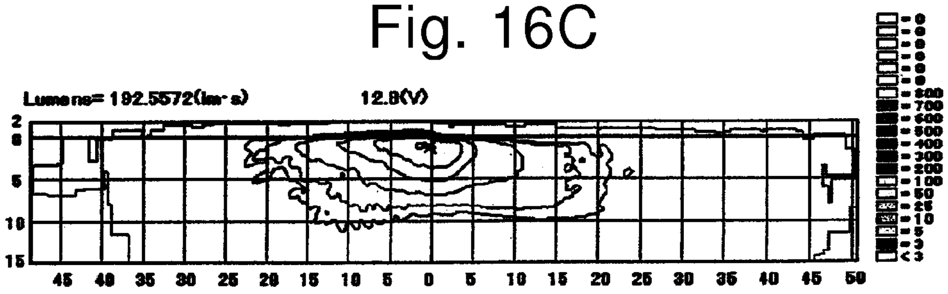
FIG. 16C is a light distribution pattern according to a third projection system for the vehicle headlight of FIG. 12.

FIGS. 16A to 16C show simulation results of light distribution patterns according to the vehicle headlight 10.

FIG. 16A shows a light distribution pattern according to light L1. The light L1 from the bulb 11 is reflected by the first main reflecting surface 12, penetrates the first main projection lens 16, and is emitted towards the front.

FIG. 16B shows a light distribution pattern according to light L2. The light L2 from the bulb 11 is reflected by the second main reflecting surface 13, penetrates the second main projection lens 17, and is emitted towards the front. In this case, it can be seen from the drawing that an overhead line is formed due to the slit 20*b* of the second main light shielding shutter 20.

FIG. 16C shows a light distribution pattern according to light L3. The light L3 is emitted forward from the bulb 11 and reflected by the sub-reflecting surface 14 towards the plane mirror 15. Then, the light L3 is reflected by the plane mirror 15, penetrates the sub-projection lens 18, and is emitted towards the front. In this case, the light is concentrated substantially at the center of the light distribution pattern. In addition to this, it can be seen from the drawing that an overhead line is formed due to the slit 21*b* of the sub-light shielding shutter 21.

Figure 17A:
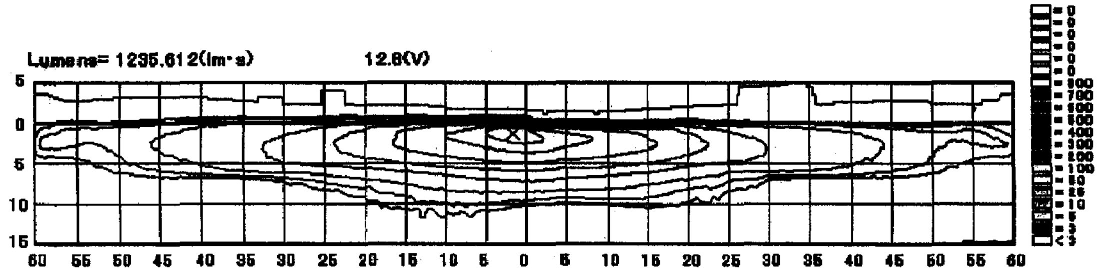
FIG. 17A is an entire light distribution pattern for the vehicle headlight of FIG. 12.

Consequently, the light distribution pattern of the entire vehicle headlight 10 according to light L1, L2, and L3 is shown in the light distribution pattern of FIG. 17A. As can be understood from the pattern, the total luminous flux increases together with the greatest brightness being sufficiently improved close to the center of the light distribution pattern.

Figure 17B:
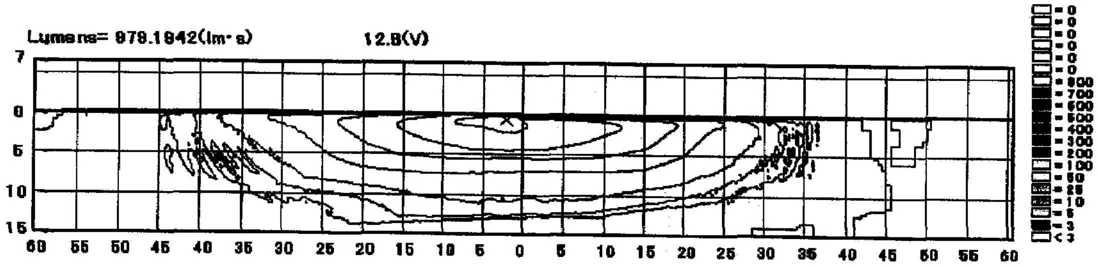
Fig. 17B Conventional Art
FIG. 17B is an entire light distribution pattern for a conventional vehicle headlight.

The headlight light distribution pattern can provide a brightness equal to approximately 1000 lm, for example, as compared to the entire light distribution pattern according to a conventional single type vehicle headlight as shown in FIG. 17B. The diffusion properties to the left and right are also favorable and the visibility of an overhead sign can be ensured.

In the exemplary embodiment described above, although the vehicle headlight 10 is configured as a so-called triple type, it is not limited to this. The first main reflecting surface 12, the first main projection lens 16, and the first main light shielding shutter 19 can be omitted. Alternatively, the second main reflecting surface 13, the second main projection lens 17, and the second main light shielding shutter 20 can be omitted. In this case, reductions in the light utilization efficiency of light from the bulb 11 can be compensated by expanding the remaining second main reflecting surface 13 or the first main reflecting surface 14 and/or the sub-reflecting surface 14. In this case, a different double type vehicle headlight from that in the first exemplary embodiment can be configured, and therefore, an original attractive outside appearance can also be presented.

Furthermore, the slits 20*b* and 21*b* are formed in the second main light shielding shutter 20 and the sub-light shielding shutter 21 in the above exemplary embodiment, but the disclosed subject matter is not limited thereto. At least one slit may be formed in any one of light shielding shutters 19, 20, and 21, or no slit may be provided.

In the above exemplary embodiment, the plane mirror 15 is used to direct light reflected from the sub-reflecting surface 14 towards the vicinity of the focus of the sub-projection lens 18 (or secondary projection lens), but the disclosed subject matter is not limited thereto. Another type of reflecting surface (e.g., parabolic reflecting surfaces or the like) may be used instead of the planar reflecting surface. In this case, the focus of the reflecting surface is designed so as to be positioned near the focus of the sub-projection lens 18, thereby achieving the same effect as in the case of the plane mirror 15.

Figure 18:
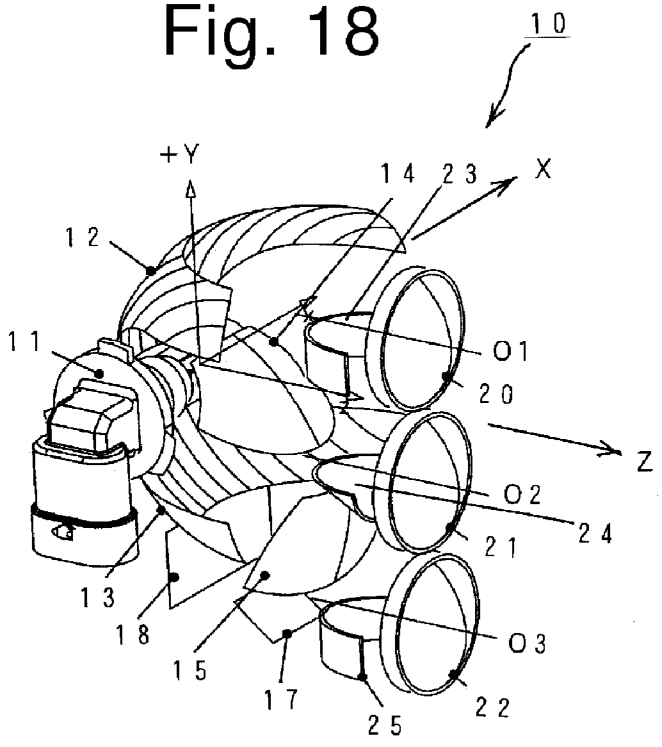
FIG. 18 is a schematic perspective view showing still another example of a configuration of a vehicle headlight made in accordance with principles of the disclosed subject matter.
Figure 19:
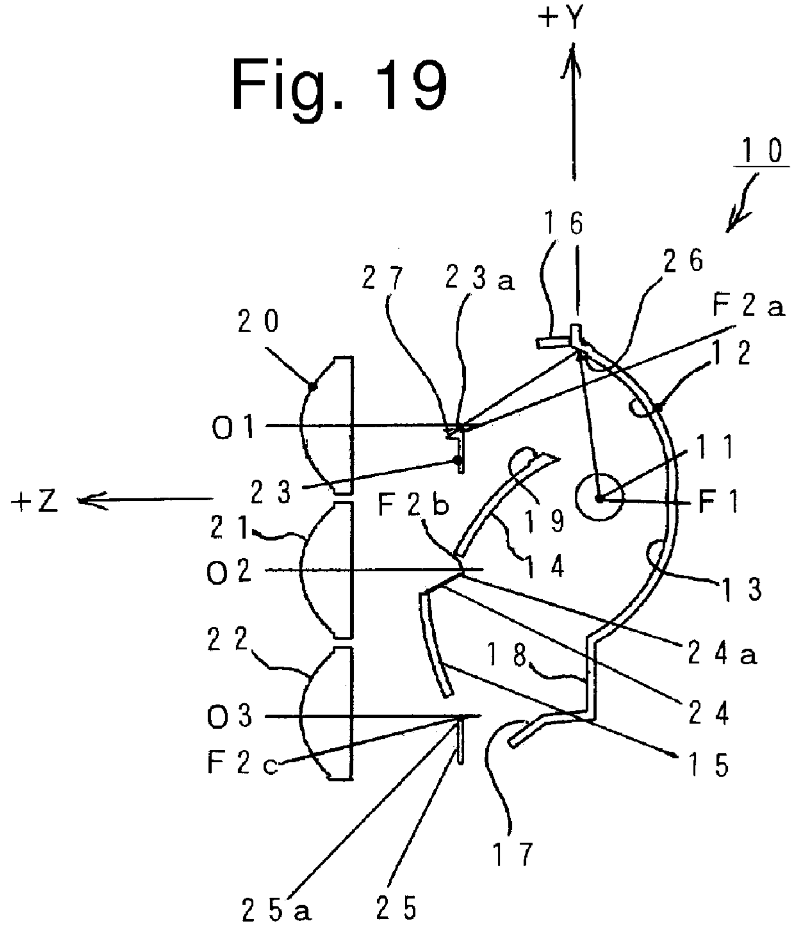
FIG. 19 is a schematic cross sectional view of the vehicle headlight in FIG. 18, seen from the +X direction.

FIG. 18 and FIG. 19 show another example of a vehicle headlight made in accordance with principles of the disclosed subject matter.

In FIGS. 18 and 19, the vehicle headlight 10 constitutes a headlight for irradiating a low beam light distribution pattern of light, for example. The vehicle headlight 10 of this exemplary embodiment is configured to include: a bulb 11 serving as a light source; a first reflecting surface 12 and a second reflecting surface 13 which reflect light from the bulb 11 towards the front; a first auxiliary reflecting surface 14 and a second auxiliary reflecting surface 15 arranged facing the rear in front of the bulb 11; a third auxiliary reflecting surface 16 arranged above the bulb 11; a first plane mirror 17, a second plane mirror 18, and a third plane mirror 19 that reflect light reflected from the first to third auxiliary reflecting surfaces 14 to 16 towards the front (in an irradiation direction), respectively; a first projection lens 20, a second projection lens 21, and a third projection lens 22; a first light shielding shutter 23, a second light shielding shutter 24, and a third light shielding shutter 25; a reflecting surface 26, provided substantially at an upper edge of the first reflecting surface 12, for forming an overhead sign light distribution pattern; and a reflecting plate 27 that reflects light reflected from the reflecting surface 26 towards the front in the irradiation direction.

The bulb 11 can be adopted as the same as that used in the exemplary embodiment of FIG. 5, and can be secured by a socket to be powered thereby. In the illustrated exemplary embodiment, for example, the bulb 11 may be a so-called C-8 type halogen bulb.

As shown in FIGS. 18 and 19, the bulb 11 can be arranged almost sideways with respect to the optical axis O that extends horizontally in the front-to-rear direction of the vehicle and the distal end of the bulb also extends towards the outside of the side of the vehicle (in other words, in the +X direction). In addition to this, the bulb 11 is also arranged such that the emission center 11*a* thereof is positioned on the optical axis O. When installing the bulb 11, it is inserted from the center of the vehicle, namely from the −X side inside the engine compartment and then securely held with a known means (not shown).

The first reflecting surface 12 is arranged over (region in the +Y direction) the rear (region in the −Z direction) of the bulb 11.

Figure 20:
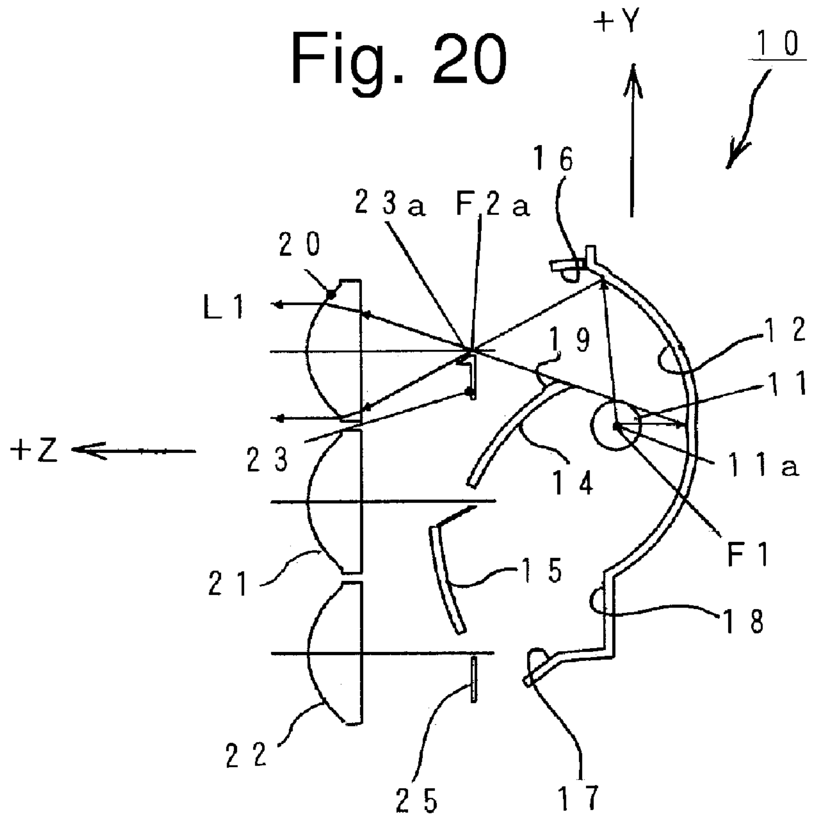
FIG. 20 is a schematic cross sectional view showing a light path according to a system including a first reflecting surface and a first projection lens in the vehicle headlight of FIG. 18.

As shown in FIG. 20, the first reflecting surface 12 is composed of an elliptical reflecting surface that is concave towards the front so as to reflect light emitted upward and rearward from the bulb 11 towards the front. This elliptical reflecting surface 12 has a first focus F1 and a second focus F2*a*. The light emission center 11*a* of the bulb 11 is positioned close to the first focus F1. The second focus F2*a* is positioned in front and over the optical axis O and on an optical axis O1 of the first projection lens 20.

Examples of the elliptical reflecting surfaces in the present exemplary embodiment may include those exemplified in the exemplary embodiment of FIG. 5.

In this configuration, light emitted from the bulb 11 in the −Z direction as well as upward is reflected by the first reflecting surface 12 and then travels towards a rear focus of the first projection lens 20 (described later). The light then passes near the first light shielding shutter 23, penetrates the first projection lens 20, and is emitted towards the front (in the +Z direction, or the light).

The second reflecting surface 13 is arranged under (region in the −Y direction) the rear (region in the −Z direction) of the bulb 11.

Figure 21:
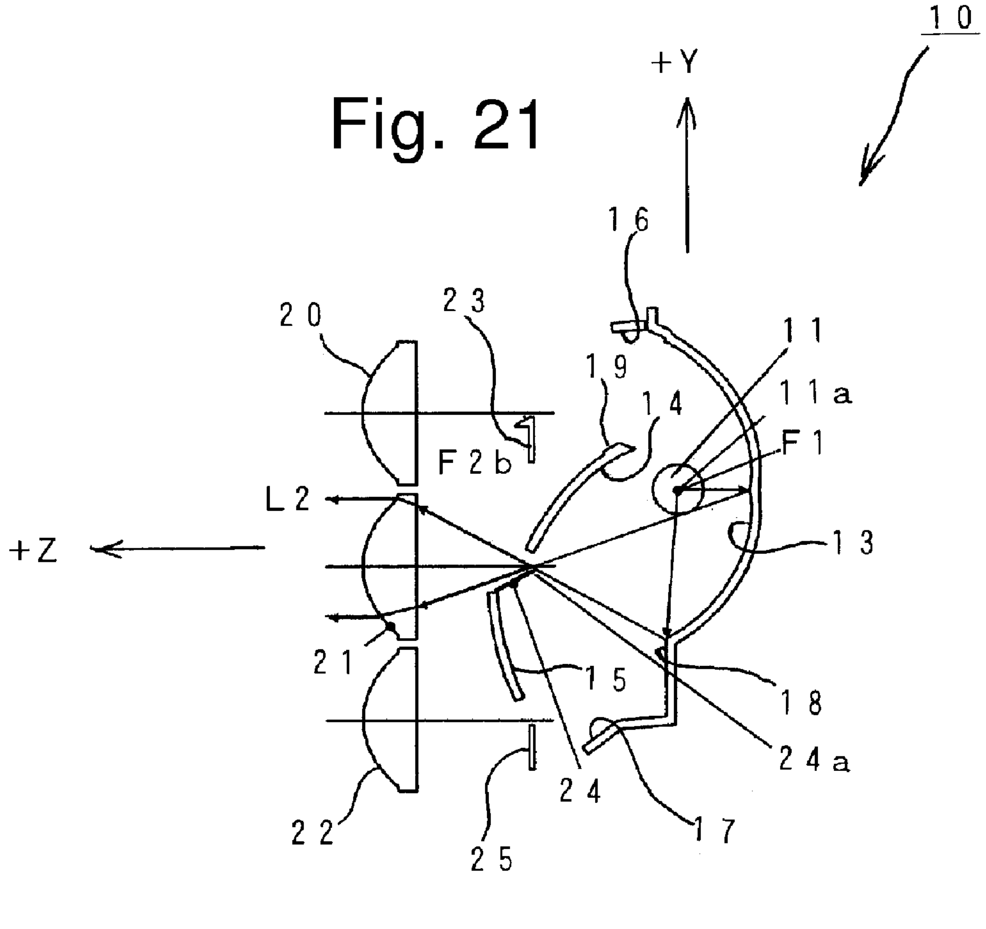
FIG. 21 is a schematic cross sectional view showing a light path according to a system including a second reflecting surface and a second projection lens in the vehicle headlight of FIG. 18.

As shown in FIG. 21, the second reflecting surface 13 can be composed of an elliptical reflecting surface that is concave towards the front so as to reflect light emitted rearward and downward from the bulb 11 towards the front. This elliptical reflecting surface 13 has a first focus F1 and a second focus F2*b*. The light emission center 11*a* of the bulb 11 is positioned close to the first focus F1. The second focus F2*b* is positioned in front and under the optical axis O and on an optical axis O2 of the second projection lens 21.

In this configuration, light emitted from the bulb 11 in the −Z direction as well as downward is reflected by the second reflecting surface 13 and then travels towards a rear focus of the second projection lens 21 (described later). The light then passes near the second light shielding shutter 24, penetrates the second projection lens 21, and is emitted towards the front.

In this exemplary embodiment, the first reflecting surface 12 and the second reflecting surface 13 described above as well as the first to third auxiliary reflecting surfaces 14, 15, and 16 described later can actually be composed of a combination of strip-shaped elliptical surfaces shaped as in the previous exemplary embodiment, the details of which is omitted here because it is described hereinabove. The first reflecting surface 12 and the second reflecting surface 13 are also configured to diffuse light in the horizontal direction towards both the left and right taking into consideration the road surface irradiation of the light distribution pattern.

The first auxiliary reflecting surface 14 is arranged in front (region in the +Z direction) of the bulb 11 at a position that does not interfere with the incident light reflected from the first and second reflecting surfaces 12 and 13 onto the first and second projection lenses 16 and 17 as well as substantially at the optical axis O.

The first auxiliary reflecting surface 14 is composed of an elliptical reflecting surface that is concave towards the rear so as to reflect light emitted from the bulb 11 to the front towards the rear as well as slanting downward (in the −Y direction). This elliptical reflecting surface has a first focus F1 and a second focus. The light emission center 11*a* of the bulb 11 is positioned close to the first focus F1. The second focus is designed such that it is positioned at a position conjugate to or substantially the same as the focus F2*c* at the rear of the third projection lens 22 by virtually placing the second focus by means of the first plane mirror 17.

Because of this, the light emitted from the bulb 11 in nearly the +Z direction is reflected by the first auxiliary reflecting surface 14 and then further reflected by the first plane mirror 17. The reflected light travels towards the focus F2*c* at the rear of the third projection lens 22, passes near the third light shielding shutter 25, penetrates the third projection lens 22, and then emits towards the front.

It should be noted that the first auxiliary reflecting surface 14 can be configured to generate the diffused light in the horizontal direction towards both the left and right sides.

The second auxiliary reflecting surface 15 is arranged under (region in the −Y direction) the front (region in the +Z direction) of the bulb 11 that does not interfere with the incident light from the bulb 11 or reflected from the second reflecting surface 12 and the first plane mirror 17 onto the second and third projection lenses 21 and 22. At the same time, it is arranged between the optical axes O2 and O3.

Figure 23:
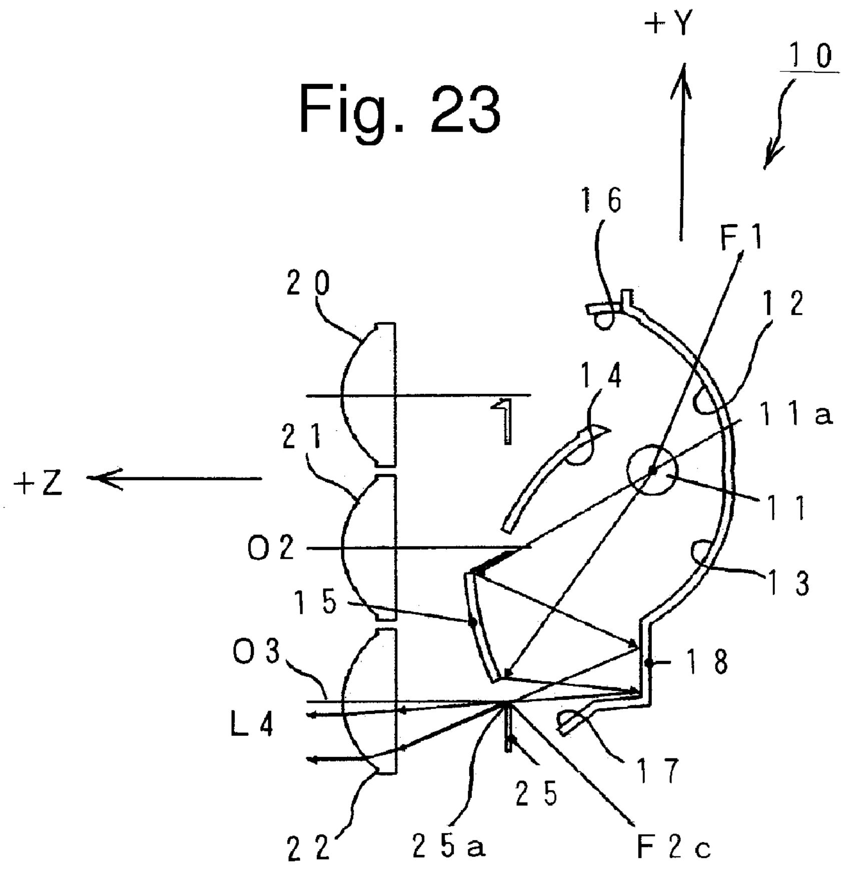
FIG. 23 is a schematic cross sectional view showing a light path according to a system including a second auxiliary reflecting surface, a second plain mirror, and the third projection lens in the vehicle headlight of FIG. 18.

As shown in FIG. 23, the second auxiliary reflecting surface 15 is composed of an elliptical reflecting surface that is concave towards the rear so as to reflect light emitted frontward and downward from the bulb 11 towards the rear as well as slanting downward. This elliptical reflecting surface has a first focus F1 and a second focus. The light emission center 11*a* of the bulb 11 is positioned close to the first focus F1. The second focus is designed such that it is positioned at a position conjugate to or substantially the same as the focus F2*c* at the rear of the third projection lens 22 by virtually placing the second focus by means of the second plane mirror 18.

Because of this, the light emitted from the bulb 11 forwards and downwards is reflected by the second auxiliary reflecting surface 15 and then further reflected by the second plane mirror 18. The reflected light travels towards the focus at the rear of the third projection lens 22, passes near the third light shielding shutter 25, penetrates the third projection lens 22, and then emits towards the front. In this configuration, the first auxiliary reflecting surface 14 is configured to generate the diffused light in the horizontal direction towards both the left and right sides.

The third auxiliary reflecting surface 16 is arranged above the front (region in the +Z direction) of the first reflecting surface 12 (at the front end of the first reflecting surface 12 in this illustrated exemplary embodiment).

Figure 24:
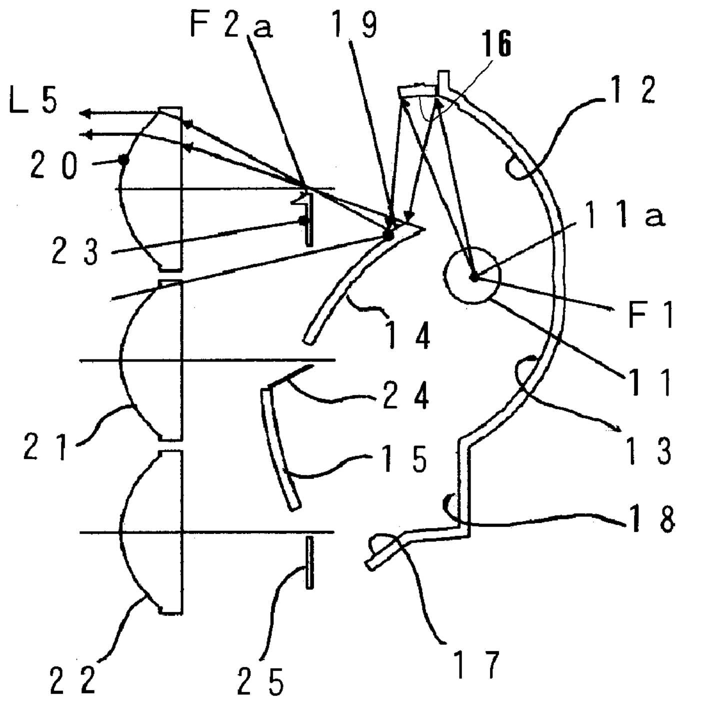
FIG. 24 is a schematic cross sectional view showing a light path according to a system including a third auxiliary reflecting surface, a third plain mirror, and the first projection lens in the vehicle headlight of FIG. 18.

As shown in FIG. 24, the third auxiliary reflecting surface 16 is composed of an elliptical reflecting surface that is concave downwards so as to reflect light emitted upward from the bulb 11 towards the front as well as slanting downward. This elliptical reflecting surface has a first focus F1 and a second focus. The light emission center 11*a* of the bulb 11 is positioned close to the first focus F1. The second focus is designed such that it is positioned at a position conjugate to or substantially the same as the focus F2*c* at the rear of the first projection lens 20 by virtually placing the second focus by means of the third plane mirror 19.

Because of this, the light emitted from the bulb 11 substantially upward is reflected by the third auxiliary reflecting surface 16 and then further reflected by the third plane mirror 19. The reflected light travels towards the focus F2*a* at the rear of the first projection lens 20, passes near the first light shielding shutter 23, penetrates the first projection lens 20, and then emits towards the front. In this configuration, the third auxiliary reflecting surface 16 is configured to generate the diffused light in the horizontal direction towards both the left and right sides.

Figure 22:
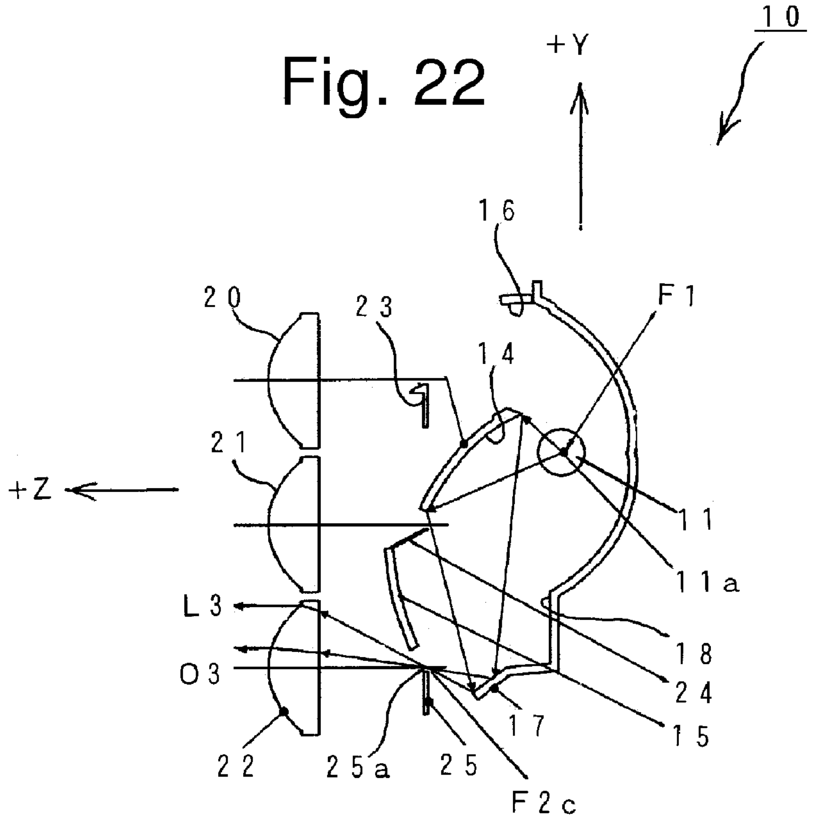
FIG. 22 is a schematic cross sectional view showing a light path according to a system including a first auxiliary reflecting surface, a first plain mirror, and a third projection lens in the vehicle headlight of FIG. 18.

As shown in FIG. 22, the first plane mirror 17 is arranged substantially at a lower side of the optical axis O3 of the third projection lens 22. The first plane mirror 17 is installed at an angle of inclination such that it reflects the light reflected from the first auxiliary reflecting surface 14 and directs the light towards the focus F2*c* at the rear of the third projection lens 22.

As shown in FIG. 23, the second plane mirror 18 is arranged substantially at an upper side of the optical axis O3 of the third projection lens 22. The second plane mirror 17 is installed at an angle of inclination such that it reflects the light reflected from the second auxiliary reflecting surface 15 and directs the light towards the focus F2*c* at the rear of the third projection lens 22.

As shown in FIG. 24, the third plane mirror 19 is arranged substantially at the optical axis O1 so that it does not interfere with the incident light from the bulb 11 or reflected from the first and second reflecting surfaces 12 and 13 onto the first and second projection lenses 20 and 21. The third plane mirror 19 is installed at an angle of inclination such that it reflects the light reflected from the third auxiliary reflecting surface 16 and directs the light towards the focus F2*a* at the rear of the first projection lens 20. It should be noted that the illustrated exemplary embodiment includes the third plane mirror 19 provided on the rear side of the first auxiliary reflecting surface 14 (in the +Y and +Z direction).

The first projection lens 20 can be composed of a convex lens, and possibly an aspheric lens. The focus at the rear (light source side) of the first projection lens 20 is configured such that it is positioned close to the second focus F2*a* of the first main reflecting surface 12 above the optical axis O and on the optical axis O1 parallel to the optical axis O.

In the same manner, the second projection lens 21 can be composed of a convex lens, and possibly an aspheric lens. The focus at the rear (light source side) of the second projection lens 21 is configured such that it is positioned close to the second focus F2*b* of the second reflecting surface 13 below the optical axis O and on the optical axis O2 parallel to the optical axis O.

In the same manner, the third projection lens 22 can be composed of a convex lens, and possibly an aspheric lens. The focus at the rear (light source side) of the third projection lens 22 is configured such that it is positioned below the optical axis O and on an optical axis O3 parallel to the optical axis O below the second projection lens 21. At the same time, the rear focus thereof is configured such that it is positioned at a position conjugate to or substantially the same as the second foci of the first and second auxiliary reflecting surfaces by virtually placing the rear focus by means of the first and second plane mirrors 17 and 18.

The first light shielding shutter 23 can be formed from an opaque material. The upper edge 23*a* of the shutter 23 is arranged close to the focus F2*a* at the rear (light source side) of the first projection lens 20. The first light shielding shutter 23 is designed such that the upper edge 23*a* of the shutter 23 forms a cutoff line in the light distribution pattern of, for example, a low beam.

The second light shielding shutter 24 can also be formed from a opaque material. The upper edge 24*a* of the shutter 24 is arranged close to the focus F2*b* at the rear (light source side) of the second projection lens 21. The second light shielding shutter 24 is designed such that the upper edge 24*a* of the shutter 24 forms a cutoff line in the light distribution pattern of, for example, a low beam.

Furthermore, the third light shielding shutter 25 can be formed from a opaque material. The upper edge 25*a* of the shutter 25 is arranged close to the focus F2*c* at the rear (light source side) of the third projection lens 22. The third light shielding shutter 25 is designed such that the upper edge 25*a* of the shutter 25 forms a cutoff line in the light distribution pattern of, for example, a low beam.

In this case, both sides of each of the first and third light shielding shutters 23 and 25 can be curved in an arc shape towards the corresponding first or third projection lens 20 or 22. Furthermore, both sides of the second light shielding shutter 24 can be curved in an elliptical shape towards the corresponding second projection lens 21. The curved shapes of the first to third light shielding shutter 23, 24, and 25 are designed taking into consideration the diffusion state in the left/right horizontal directions of the light that is irradiated towards the front by the first to third projection lenses 20, 21, and 22, respectively. Alternatively, any one or all of the first to third light shielding shutters 23, 24, and 25 can also be formed in a flat shape.

The reflecting surface 26 for forming an overhead sign light distribution can beintegrally formed with the first reflecting surface 12 at its upper edge as shown in FIG. 19. The reflecting surface 26 can, however, be separately formed from the reflecting surface 12.

Figure 25:
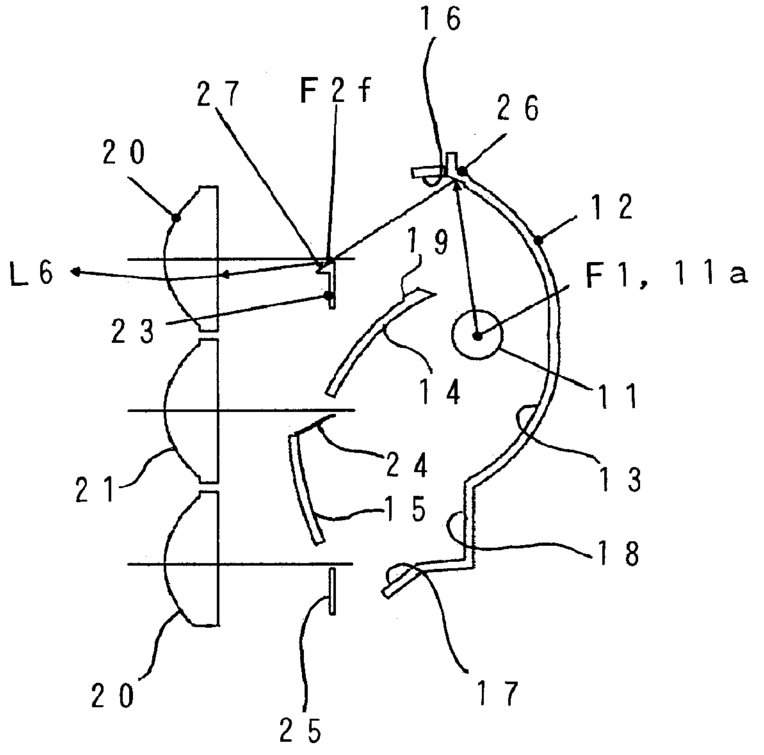
FIG. 25 is a schematic cross sectional view showing a light path according to a system including a reflecting surface for forming an overhead sign light distribution area, a reflecting plate on the shielding plate, and the first projection lens in the vehicle headlight of FIG. 18.

As shown in FIG. 25, the reflecting surface 26 is composed of an elliptical reflecting surface that is concave downward so as to reflect light emitted upward from the bulb 11 towards the front as well as slanting downward. This elliptical reflecting surface 26 has a first focus F1 and a second focus F2*f*. The light emission center 11*a* of the bulb 11 is positioned close to the first focus F1. The second focus F2*f* is at the front slightly away from the rear focus of the first projection lens 20.

According to this configuration, light emitted upward from the bulb 11 is reflected by the reflecting surface 26 to the reflecting plate 27. Then, the light further reflected by the reflecting plate 27 penetrates the first projection lens 20 to emit in the irradiation direction towards the overhead sign light distribution region.

The reflecting plate 27 is arranged in front of the first light shielding shutter 23 (which is close to the rear focus of the first projection lens 20) in a position corresponding to the overhead sign. As described above, the reflecting plate 27 reflects light from the reflecting surface 26 for forming an overhead sign light distribution pattern. Therefore, the reflecting plate 27 is installed at an angle of inclination such that it reflects and directs the light towards the overhead sign light distribution region.

When the vehicle headlight 10 according to the exemplary embodiment configured as described above powers the bulb 11 and emits light, the irradiation light can pass through a light path as described below.

At first, as shown in FIG. 20, the light L1 that is emitted from the bulb 11 over the rear is reflected by the first reflecting surface 12 and travels towards the second focus F2*a* (namely, close to the focus at the rear of the first projection lens 20). This light L1 then passes near the first light shielding shutter 25 and is irradiated towards the front while being focused by the first projection lens 20.

As shown in FIG. 21, the light L2 that is emitted from the bulb 11 under the rear is reflected by the second reflecting surface 13 and travels towards the second focus F2*b* (namely, close to the focus at the rear of the second projection lens 21). This light L2 then passes near the second light shielding shutter 24 and is irradiated towards the front while being focused by the second projection lens 21.

In addition, as shown in FIG. 22, the light L3 that is emitted from the bulb 11 towards the front is reflected by the first auxiliary reflecting surface 14 and then incident on the first plane mirror 17. The light L3 reflected by the plane mirror 17 travels towards a point close to the focus at the rear of the third projection lens 22. This light L3 then passes near the third light shielding shutter 25 and is irradiated towards the front while being focused by the third projection lens 22.

In addition, as shown in FIG. 23, the light L4 that is emitted from the bulb 11 below the front is reflected by the second auxiliary reflecting surface 15 and then incident on the second plane mirror 18. The light L4 is then reflected by the second plane mirror 18 and travels towards a point close to the focus at the rear of the third projection lens 22. This light L4 then passes near the third light shielding shutter 25 and is irradiated towards the front while being focused by the third projection lens 22.

At this time, the light L1, L2, L3, and L4 is partially blocked by the upper edges 23*a*, 24*a*, and 25*a* of the first to third light shielding shutters 23, 24, and 25, respectively. The passing light, after being blocked and shaped, is magnified and projected towards the front by each of the projection lenses 20, 21, and 22. This forms a cutoff line in the light distribution pattern and obtains a light distribution pattern of a low beam.

In addition to this, the respective reflecting surfaces 12, 13, 14, and 15 can be configured to diffuse light in the left/right horizontal directions of the light and provide a desired light distribution pattern spread horizontally.

Furthermore, as shown in FIG. 24, the light L5 that is emitted upward from the bulb 11 is reflected by the third auxiliary reflecting surface 16 and travels towards the third plane mirror 19. This light L5 reflected by the mirror 19 is directed towards the focus at the rear of the first projection lens 20. Then, the light L5 passes near the first light shielding shutter 23 and is irradiated towards the front while being focused by the first projection lens 20. In this case, the light L5, which is reflected by the third auxiliary reflecting surface 16 and then the third plane mirror 19, is incident on the first projection lens 20 at a comparatively small angle of incidence. Therefore, the greatest brightness can be sufficiently improved close to the center of the light distribution pattern of the light that is irradiated towards the front because the light L5 emitted from the first projection lens 20 is focused substantially at the center region.

The light L6 emitted upward from the bulb 11 is, as shown in FIG. 25, reflected by the reflecting surface 26 for forming an overhead sign light distribution pattern and then by the reflecting plate 27. The light L6 is irradiated towards the overhead sign light distribution region slightly upward while being focused by the first projection lens 20. This configuration can ensure the minimum intensity of illumination from the horizontal up to 4 degrees in the light distribution pattern. In this case, the light L6 is focused on a position slightly forward and away from the rear focus of the first projection lens 20. Therefore, the overhead sign light distribution region projected by the first projection lens 20 is blurred at its silhouette by the focus shifting. Consequently, the overhead sign region can irradiate signs positioned over the front of the vehicle improving the visibility of the sign.

The vehicle headlight 10 can correspond to slanting action of a front lens (not shown) in the vertical direction by shifting the respective projection lenses 20, 21, and 22 in the front-to-rear direction. Namely, in this case, the correction against the slanting of the light can be achieved by adjusting the focal lengths of the respective projection lenses 20, 21, and 22.

In addition, when the front lens slants to lateral direction seen from front, the correction against the slanting of the light can be achieved by adjusting the lateral positions of the respective projection lenses 20, 21, and 22.

Furthermore, as in the previous exemplary embodiments, since the light source is placed sideways, the length of the entire vehicle light can be shortened. Even further, the light from the bulb 11 is divided into three and light is projected towards the front by the three projection lenses 20, 21, and 22. In other words, the light collecting properties can be tripled. Because of this, the focal length and the diameter of each of the projection lenses 20, 21, and 22 can be made smaller. Therefore, each of the projection lenses 20, 21, and 22 is configured in a small size thereby making it possible to further shorten the length of the vehicle headlight 10 in the direction of the optical axis as a whole as well as reduce the thickness in the upper/lower direction even more. Namely, the entire vehicle headlight 10 can be made smaller.

Furthermore, the focal length (the first and second foci) of each of the elliptical reflecting surfaces 12, 13, 14, 15, and 16 can be shortened. This can further shorten the entire length of the vehicle headlight 10.

The conventional single type vehicle headlight with a bulb placed sideways has a depth of about 120 mm, whereas the vehicle headlight 10 can have a shortened entire length of 100 mm or less, for example.

By dispersing the light quantity being incident on each of the projection lenses 20, 21, and 22 in the vehicle headlight 10 with this type of configuration, the light quantity of each can be reduced by almost one third as compared to a conventional single type vehicle headlight. Since the generation of heat in each of the projection lenses 20, 21, and 22 is almost reduced by one third in the same manner, each of the projection lenses 20, 21, and 22 can be formed from a resin material.

In this instance, each of the projection lenses 20, 21, and 22 can be configured as a Fresnel lens. This makes it possible to reduce the thickness of each of the projection lenses 20, 21, and 22 in the direction of the optical axis by 10 mm or more and also to shorten the length of the entire vehicle headlight 10.

Figure 26:
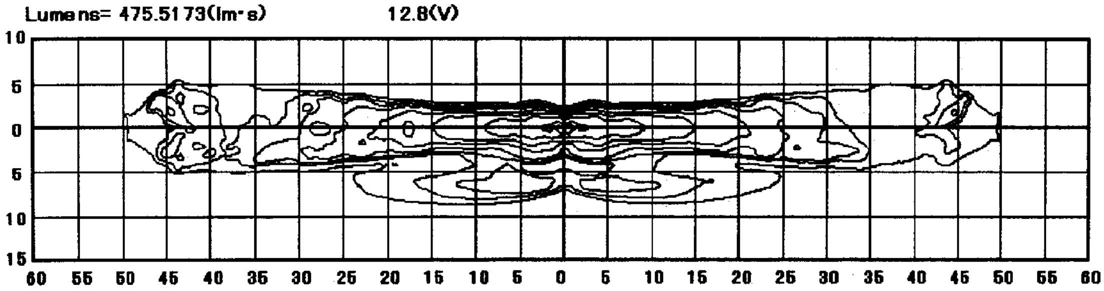
FIG. 26 is a graph showing a simulation result of a light distribution pattern in the vehicle headlight of FIG. 18.

FIG. 26 shows simulation results of a light distribution pattern according to the vehicle headlight 10 described above. In this instance, the results were obtained by employing a halogen bulb as the bulb 11. The simulation results reveal that the maximum intensity of light at the center of the light distribution pattern is approximately 475 lm which is significantly improved as compared to the conventional longitudinal type vehicle headlight 1. This result shows that the light L1 to L4 according to the above-described configuration can increase the total luminous flux in the light distribution pattern. In addition to this, the light L5 can increase the greatest brightness at the center region of the light distribution pattern.

Figure 4A:
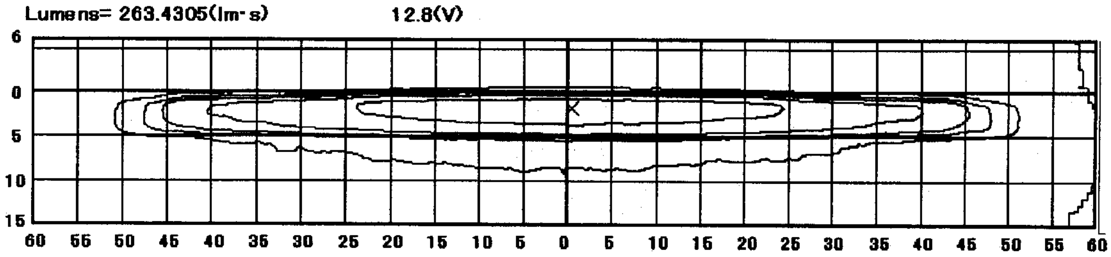
Fig. 4A Conventional Art
FIGS. 4A and 4B are graphs showing a light distribution pattern when the front is perpendicular (4A) and when the front is inclined (4B) in the vehicle headlight of FIG. 3.
Figure 4B:
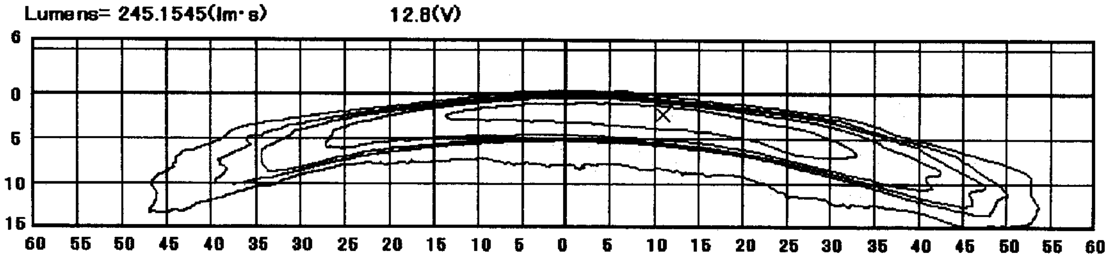
Fig. 4B Conventional Art

The headlight light distribution pattern can provide a sufficient brightness as compared to the entire light distribution pattern according to a conventional single type vehicle headlight as shown in FIG. 4A. In addition, the diffusion properties to the left and right are also favorable and the visibility of an overhead sign can be ensured.

The vehicle headlight 10 according to the presently disclosed exemplary embodiment can form an overhead sign light distribution by the dedicated reflecting surface 26 and plate 27, but the disclosed subject matter is not limited thereto. For example, any one of the light shielding shutters 23, 24, and 25 may be provided with a slit at a certain position thereof so as to form an overhead sign light distribution. In this case, light passing through the slit is irradiated via a corresponding projection lens toward the front slightly upwards. Therefore, such a slit can be used to form an overhead sign region in order to satisfy the minimum intensity of illumination from the horizontal up to 4 degrees in the light distribution pattern. Consequently, the light in the overhead sign region can be projected onto signs positioned over the front of the vehicle improving the visibility of the sign. In order to shade silhouettes of the overhead sign light distribution, such a slit is arranged slightly shifted towards the front (+Z direction) away from the rear focus of the corresponding projection lens.

The vehicle headlight 10 of the present exemplary embodiment is provided with the light shielding shutters 23, 24, and 25 corresponding to the projection lenses 20, 21, and 22, respectively, but the disclosed subject matter is not limited thereto. Alternatively, these shutters may be omitted when the headlight is used as a headlight for a high beam light distribution.

Even further, in the exemplary embodiments described above, although the vehicle headlight 10 is configured as a left side headlight for an automobile, the disclosed subject matter is not limited thereto. The vehicle headlight can be configured as a right side headlight with a bilateral symmetrical configuration or a vehicle headlight in a keep-to-the-right zone by configuring with bilateral symmetry with respect to the optical axis O. In addition the light can be adjusted to form other types of vehicle and traffic related lights, spot lights, tail lights, etc.

Even further, in the exemplary embodiments described above, although the vehicle headlight 10 is configured as a so-called headlamp, the disclosed subject matter is not limited thereto and can be configured as an auxiliary headlight such as a fog lamp, or a signal light.

While there has been described what are at present considered to be exemplary embodiments of the invention, it will be understood that various modifications may be made thereto, and it is intended that the appended claims cover such modifications as fall within the true spirit and scope of the invention

What is claimed is:

1. A vehicle light configured for installation in a vehicle, comprising:

a light source having a light emitting portion and configured in a longitudinal direction, and when installed in the vehicle the light source being located on an optical axis that is configured to extend horizontally in a front-to-rear direction of the vehicle so that the longitudinal direction intersects the optical axis at a certain angle, the light source configured to irradiate light in an irradiation direction;

a first projection lens having a convex shape and a rear focus, the first projection lens being located in front of the light source in the irradiation direction and above the optical axis;

a second projection lens having a convex shape and a rear focus, the second projection lens being located in front of the light source in the irradiation direction and below the optical axis;

a first elliptical reflecting surface located above the optical axis, the first elliptical reflecting surface having a first focus substantially at the light emitting portion of the light source and a second focus substantially at the rear focus of the first projection lens, the first elliptical reflecting surface configured to reflect light that is emitted backward and upward from the light source and to direct the light toward the rear focus of the first projection lens;

a second elliptical reflecting surface located below the optical axis, the second elliptical reflecting surface having a first focus substantially at the light emitting portion of the light source and a second focus substantially at the rear focus of the second projection lens, the second elliptical reflecting surface configured to reflect light emitted backward and downward from the light source and to direct the light toward the rear focus of the second projection lens;

a third reflecting surface located in front of the light source and configured such that the third reflecting surface does not interfere with incident light reflected from the first and second reflecting surfaces on the respective first and second projection lenses, the third reflecting surface reflecting light emitted forward from the light source toward an area below the light source; and a plane mirror located below the light source and configured to reflect the light from the third reflecting surface toward the rear focus of the second projection lens, wherein the third reflecting surface has a first focus located substantially at the light emitting portion of the light source and a second focus positioned at a position conjugate to the rear focus of the second projection lens by virtually placing the second focus by action of the plane mirror.

2. The vehicle light according to claim 1, wherein at least one of the first elliptical reflecting surface and the second elliptical reflecting surface is composed of a combination of strip-shaped elliptical surfaces.

3. The vehicle light according to claim 1, wherein at least one of the first elliptical reflecting surface and the second elliptical reflecting surface is composed of a free-curved surface based on an ellipse.

4. The vehicle light according to claim 1, further comprising:

a light shielding shutter located adjacent a corresponding projection lens that is selected from at least one of the first projection lens and the second projection lens, the light shielding shutter located substantially at the rear focus of the corresponding projection lens, and configured to form a cut-off line to define a predetermined light distribution pattern.

5. The vehicle light according to claim 4, wherein the light shielding shutter is formed as one of a plane surface perpendicular to the optical axis, a curved surface in an arc shape, and a surface having an elliptical shape facing the front direction.

6. The vehicle light according to claim 4, further comprising:

a fourth elliptical reflecting surface located in front of and above the first elliptical reflecting surface, the fourth elliptical reflecting surface having a first focus substantially at the light emitting portion of the light source and a second focus in front of the light shielding shutter, the fourth elliptical reflecting surface configured to reflect light emitted forward and upward from the light source and to direct the light toward a front side of the light shielding shutter; and a reflecting plate located in front of and below the light shielding shutter, the reflecting plate configured to reflect light received from the fourth elliptical reflecting surface toward an upward direction.

7. The vehicle light according to claim 6, wherein the fourth elliptical reflecting surface is composed of a combination of strip-shaped elliptical surfaces.

8. The vehicle light according to claim 6, wherein the fourth elliptical reflecting surface is composed of a free-curved surface based on an ellipse.

9. The vehicle light according to claim 1, wherein at least one of the first projection lens and the second projection lens is composed of a Fresnel lens.

10. A vehicle light configured for installation in a vehicle, comprising:

a light source having a light emitting portion and configured in a longitudinal direction, when installed in the vehicle the light source being located on an optical axis that is configured to extend horizontally in a front-to-rear direction of the vehicle so that the longitudinal direction intersects the optical axis at a certain angle, the light source including a tip end side and configured to irradiate light in an irradiation direction;

a first projection lens located in front of the light source in the irradiation direction and one of above and below the optical axis, the first projection lens including a rear focus;

a sub projection lens located in front of the light source in the irradiation direction and on the tip end side of the light source, the sub projection lens including a rear focus;

a first elliptical reflecting surface having a first focus substantially at the light emitting portion of the light source and a second focus substantially at the rear focus of the first projection lens, the first elliptical reflecting surface configured to reflect light emitted backward and at least one of upward and downward from the light source and to direct the light toward the rear focus of the first projection lens;

a sub reflecting surface located in front of the light source and configured to reflect light emitted forward from the light source sideways to a region on the tip end side of the light source; and a third reflecting surface located at the region on the tip end side of the light source and configured to reflect light received from the sub reflecting surface toward the rear focus of the sub projection lens, wherein the sub reflecting surface has a first focus located substantially at the light emitting portion of the light source and a second focus positioned at a position conjugate to the rear focus of the sub projection lens by virtually placing the second focus by action of the third reflecting surface.

11. The vehicle light according to claim 10, further comprising:

a second projection lens located in front of the light source and on an opposite side of the optical axis with respect to the first projection lens, the second projection lens having a rear focus; and a fourth elliptical reflecting surface having a first focus substantially at the light emitting portion of the light source and a second focus substantially at the rear focus of the second projection lens, the fourth elliptical reflecting surface configured to reflect light emitted backward and at least one of downward and upward from the light source and to direct the light toward the rear focus of the second projection lens.

12. The vehicle light according to claim 10, further comprising:

a light shielding shutter located adjacent to a corresponding projection lens selected from at least one of the first projection lens, the sub projection lens, and a second projection lens, the light shielding shutter being located substantially at the rear focus of the corresponding projection lens and configured to form a cut-off line to define a predetermined light distribution pattern.

13. The vehicle light according to claim 12, wherein the light shielding shutter includes at least one of a plane surface perpendicular to the optical axis, a curved surface configured in an arc shape, and a surface having an elliptical shape facing the front direction.

14. The vehicle light according to claim 12, wherein at least one light shielding shutter is provided with a slit configured to allow light passing therethrough to irradiate in an upward direction, the slit being located forward and away from the rear focus of the corresponding projection lens.

15. The vehicle light according to claim 10, wherein at least one of the first projection lens, the sub projection lens, and a second projection lens is composed of a Fresnel lens.

16. A vehicle light configured for installation in a vehicle, comprising:

a light source having a light emitting portion and configured in a longitudinal direction, and when installed in the vehicle the light source being located on an optical axis that is configured to extend horizontally in a front-to-rear direction of the vehicle so that the longitudinal direction intersects the optical axis at a certain angle, the light source configured to irradiate light in an irradiation direction;

a first projection lens located in front of the light source in the irradiation direction and above the optical axis, the first projection lens including a rear focus;

a second projection lens located in front of the light source in the irradiation direction and below the optical axis, the second projection lens including a rear focus;

a third projection lens located in front of the light source in the irradiation direction and below the second projection lens, the third projection lens including a rear focus;

a first elliptical reflecting surface located above the optical axis, the first elliptical reflecting surface having a first focus substantially at the light emitting portion of the light source and a second focus substantially at the rear focus of the first projection lens, the first elliptical reflecting surface configured to reflect light emitted backward and upward from the light source and to direct the light toward the rear focus of the first projection lens;

a second elliptical reflecting surface located below the optical axis, the second elliptical reflecting surface having a first focus substantially at the light emitting portion of the light source and a second focus substantially at the rear focus of the second projection lens, the second elliptical reflecting surface configured to reflect light emitted backward and downward from the light source and to direct the light toward the rear focus of the second projection lens;

a first auxiliary reflecting surface located in front of the light source such that the first auxiliary reflecting surface does not interfere with incident light reflected from the first reflecting surface and second reflecting surface on the respective first projection lens and second projection lens, the first auxiliary reflecting surface configured to reflect light emitted forward from the light source toward an area below the light source and rearward;

a second auxiliary reflecting surface located below the first auxiliary reflecting surface such that the second auxiliary reflecting surface does not interfere with incident light reflected from the second reflecting surface on the second projection lens and light reflected from the first auxiliary reflecting surface, the second auxiliary reflecting surface configured to reflect light emitted forward and downward from the light source toward an area behind the light source;

a first plane mirror located below the second elliptical reflecting surface, and configured to reflect light from the first auxiliary reflecting surface toward the rear focus of the third projection lens; and a second plane mirror located below the second elliptical reflecting surface, and configured to reflect light from the second auxiliary reflecting surface toward the rear focus of the third projection lens, wherein the first auxiliary reflecting surface has a first focus located substantially at the light emitting portion of the light source and a second focus positioned at a position conjugate to or substantially the same as the rear focus of the third projection lens by virtually placing the second focus by action of the first plane mirror, and the second auxiliary reflecting surface has a first focus located substantially at the light emitting portion of the light source and a second focus positioned at a position conjugate to or substantially the same as the rear focus of the third projection lens by virtually placing the second focus by action of the second plane mirror.

17. The vehicle light according to claim 16, further comprising:

a third elliptical auxiliary reflecting surface located in front of and above the first reflecting surface; and a third plane mirror located in front of the light source and above the first auxiliary reflecting surface such that the mirror does not interfere with incident light reflected from the first reflecting surface on the first projection lens, the third plane mirror configured to reflect light from the third auxiliary reflecting surface toward the first projection lens, and wherein the third elliptical auxiliary reflecting surface has a first focus located substantially at the light emitting portion of the light source and a second focus positioned at a position conjugate to or substantially the same as the rear focus of the first projection lens by virtually placing the second focus by action of the third plane mirror.

18. The vehicle light according to claim 16, further comprising:

a light shielding shutter located adjacent a corresponding projection lens selected from at least one of the first projection lens, second projection lens, and third projection lens, the light shielding shutter being located substantially at the rear focus of the corresponding projection lens, and configured to form a cut-off line to define a predetermined light distribution pattern.

19. The vehicle light according to claim 18, wherein the light shielding shutter includes at least one of a plane surface perpendicular to the optical axis, a curved surface in an arc shape, and a surface that has an elliptical shape facing toward the front direction.

20. The vehicle light according to claim 17, further comprising:

at least one light shielding shutter including a slit configured to allow light passing therethrough to irradiate in an upward direction, the slit being located forward and away from the rear focus of the corresponding projection lens.

21. The vehicle light according to claim 18, further comprising:

an overhead elliptical reflecting surface configured to form an overhead sign light distribution pattern, the overhead elliptical reflecting surface located in front of and above the first elliptical reflecting surface, the overhead elliptical reflecting surface having a first focus substantially at the light emitting portion of the light source and a second focus at a position slightly forward of the light shielding shutter and substantially at the rear focus of the first projection lens, the overhead elliptical reflecting surface configured to reflect light emitted upward from the light source toward a position forward and away from the rear focus of the first projection lens; and a reflecting plate located in front of the light shielding shutter at a position so that the reflecting plate reflects light from the overhead elliptical reflecting surface to form an overhead sign light distribution pattern in an upward direction.

22. The vehicle light according to claim 16, wherein at least one of the first projection lens, second projection lens, and third projection lens is composed of a Fresnel lens.

* * * * *